US012624969B2

(12) United States Patent
Yokoyama et al.

(10) Patent No.: US 12,624,969 B2
(45) Date of Patent: May 12, 2026

(54) MEASURING METHOD, MEASURING SYSTEM, AND MEASURING DEVICE

(71) Applicant: Tokyo Electron Limited, Tokyo (JP)

(72) Inventors: Kimihiro Yokoyama, Miyagi (JP);
Takayuki Hatanaka, Miyagi (JP);
Ryoma Kobayashi, Miyagi (JP)

(73) Assignee: TOKYO ELECTRON LIMITED,
Tokyo (JP)

( * ) Notice: Subject to any disclaimer, the term of this
patent is extended or adjusted under 35
U.S.C. 154(b) by 282 days.

(21) Appl. No.: 18/241,934

(22) Filed: Sep. 4, 2023

(65) Prior Publication Data

US 2024/0077339 A1 Mar. 7, 2024

(30) Foreign Application Priority Data

Sep. 5, 2022 (JP) ................................. 2022-140938

(51) Int. Cl.
G01D 21/00 (2006.01)
G01D 5/241 (2006.01)
(52) U.S. Cl.
CPC ........... G01D 5/2417 (2013.01); G01D 21/00
(2013.01); *G01D 2218/10* (2021.05)

(58) Field of Classification Search
CPC ... G01D 5/2417; G01D 21/00; G01D 2218/10
See application file for complete search history.

(56) References Cited

U.S. PATENT DOCUMENTS 11,342,210 B2 * 5/2022 Potter ...................... G01D 5/24
2019/0277665 A1 * 9/2019 Sugita .................. G01D 5/2405

FOREIGN PATENT DOCUMENTS

JP 2017003557 A * 1/2017

* cited by examiner

*Primary Examiner* — Jamel E Williams
(74) *Attorney, Agent, or Firm* — XSENSUS LLP

(57) ABSTRACT

There is a method for measuring a deviation amount of a
measuring device, comprising: transferring, by using a trans-
fer device, the measuring device to a position in an area
specified by transfer position data; acquiring measurement
values using four or more sensor electrodes of the measuring
device; identifying two or more sensor electrodes among the
four or more sensor electrodes, the two or more sensor
electrodes outputting, as the measurement values, capaci-
tances that satisfy a reliability standard; and calculating the
deviation amount based on the measurement values of the
identified two or more sensor electrodes.

9 Claims, 15 Drawing Sheets

MEASURING METHOD, MEASURING SYSTEM, AND MEASURING DEVICE

CROSS-REFERENCE TO RELATED APPLICATIONS

This application claims priority to Japanese Patent Application No. 2022-140938, filed on Sep. 5, 2022, the entire contents of which are incorporated herein by reference.

TECHNICAL FIELD

Exemplary embodiments of the present disclosure relate to a measuring method, a measuring system, and a measuring device.

BACKGROUND

Japanese Laid-open Patent Publication No. 2017-3557 discloses a measuring device for measuring a capacitance. The measuring device is transferred onto an electrostatic chuck surrounded by an edge ring in a plasma processing apparatus, and measures a capacitance formed between the measuring device and the edge ring. The measuring device can obtain a deviation amount between the center of the edge ring and the center of the measuring device based on the measured capacitance.

SUMMARY

The present disclosure provides a technique for more accurately measuring a deviation amount between a center of an edge ring and a center of a measuring device.

In accordance with an aspect of the present disclosure, there is a method for measuring a deviation amount of a measuring device transferred by a transfer device. The measuring device includes a disc-shaped base substrate; and four or more sensor electrodes arranged at equal intervals along a peripheral edge of the base substrate in a circumferential direction and configured to measure measurement values indicating capacitances between the four or more sensor electrodes and an object disposed at a lateral side. The transfer device transfers an object to be processed into an area surrounded by an edge ring based on transfer position data. The deviation amount is an amount of deviation of a center position of the measuring device with respect to a center position of the area. The measuring method comprises transferring, by using the transfer device, the measuring device to a position in the area specified by the transfer position data. The measuring method comprises acquiring the measurement values using the four or more sensor electrodes of the measuring device transferred into the area. The measuring method comprises identifying two or more sensor electrodes among the four or more sensor electrodes, the two or more sensor electrodes outputting, as the measurement values, capacitances that satisfy a reliability standard. The measuring method comprises calculating the deviation amount based on the measurement values of the identified two or more sensor electrodes.

BRIEF DESCRIPTION OF THE DRAWINGS

FIG. 11 explains an example of an operation for calculating a deviation amount, and schematically shows the positional relationship between the edge ring and the measuring device.
FIG. 14 explains an example of an operation for calculating a deviation amount, and schematically shows the positional relationship between the edge ring and the measuring device.

DETAILED DESCRIPTION

Figure 1:
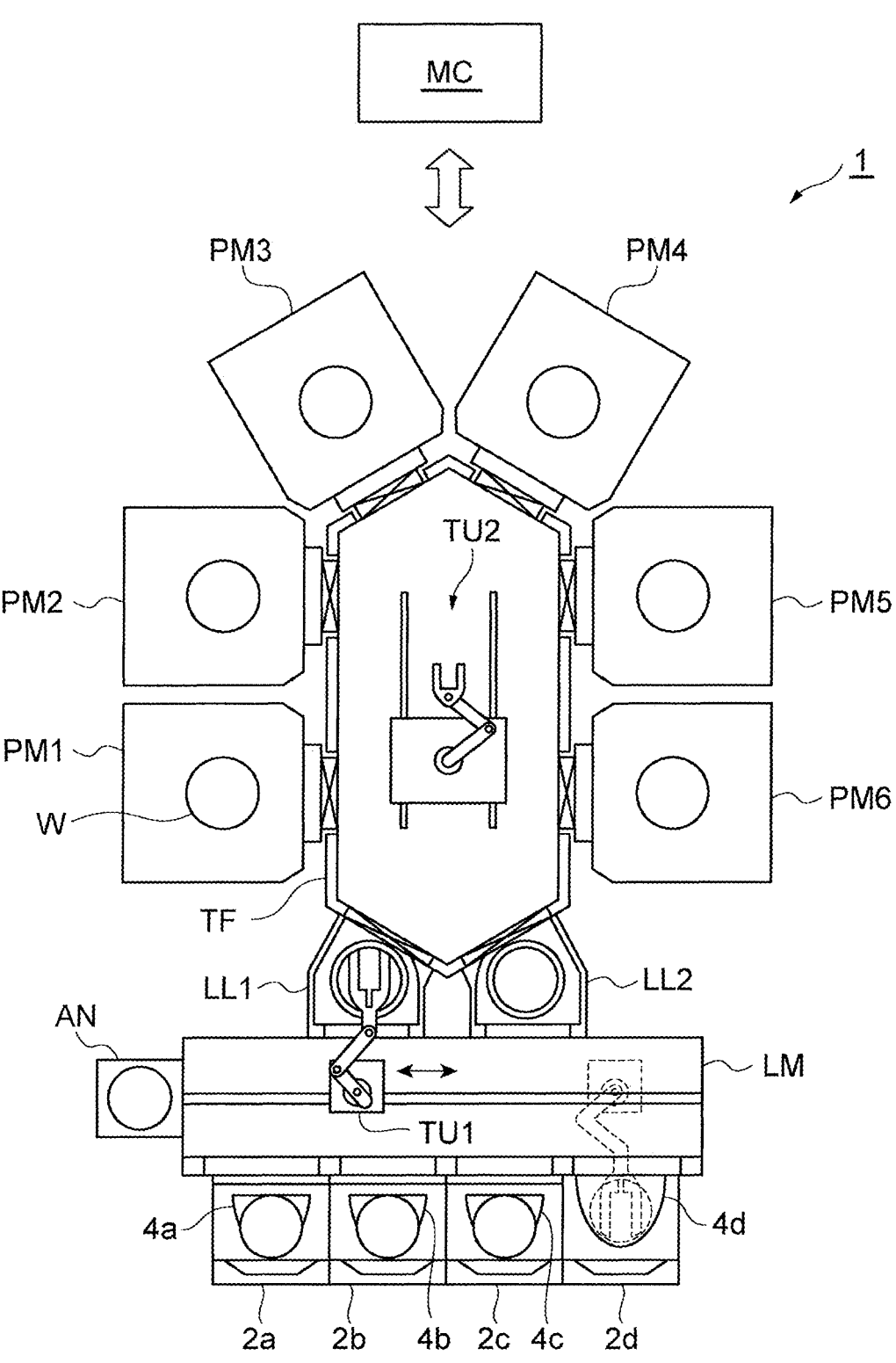
FIG. 1 illustrates a processing system.

Hereinafter, various embodiments will be described.

In accordance with an exemplary embodiment of the present disclosure, there is a method for measuring a deviation amount of a measuring device transferred by a transfer device. The measuring device includes a disc-shaped base substrate; and four or more sensor electrodes arranged at equal intervals along a peripheral edge of the base substrate in a circumferential direction and configured to measure measurement values indicating capacitances between the four or more sensor electrodes and an object disposed at a lateral side. The transfer device is a device that transfers an object to be processed into an area surrounded by an edge ring based on transfer position data. The deviation amount is an amount of deviation of a center position of the measuring device with respect to a center position of the area. The measuring method comprises transferring, by using the transfer device, the measuring device to a position in the area specified by the transfer position data. The measuring method comprises acquiring the measurement values using the four or more sensor electrodes of the measuring device transferred into the area. The measuring method comprises identifying two or more sensor electrodes among the four or more sensor electrodes, wherein the two or more sensor electrodes output, as the measurement values, capacitances that satisfy a reliability standard. The measuring method comprises calculating the deviation amount based on the measurement values of the identified two or more sensor electrodes.

In accordance with an exemplary embodiment of the present disclosure, there is a measuring system. The measuring system comprises a measuring device, a transfer device and an operation part. The measuring system includes a disc-shaped base substrate, and four or more sensor electrodes arranged at equal intervals along a peripheral edge of the base substrate in a circumferential direction and configured to measure measurement values indicating capacitances between the four or more sensor electrodes and an object disposed at a lateral side. The transfer device is configured to transfer the measuring device into the area that is surrounded by the edge ring and specified by transfer position data. The operation part is configured to calculate a deviation amount of the measuring device transferred by the transfer device. The deviation amount is an amount of deviation of a center position of the measuring device with respect to a center position of the area. The operation part acquires the measurement values obtained by the four or more sensor electrodes of the measuring device transferred into the area. The operation part identifies two or more sensor electrodes that output, as the measurement values, capacitances that satisfy a reliability standard among the four or more sensor electrodes. The operation part calculates the deviation amount based on the measurement values of the identified two or more sensor electrodes.

In accordance with an exemplary embodiment of the present disclosure, there is a measuring device. The measuring device comprises a disc-shaped base substrate, four or more sensor electrodes, and a circuit board. The four or more sensor electrodes are arranged at equal intervals along a peripheral edge of the base substrate in a circumferential direction and configured to measure measurement values indicating capacitances between the four or more sensor electrodes and an edge ring in a state where the base substrate is placed in an area surrounded by the edge ring. The circuit board is mounted on the base substrate. The circuit board is configured to acquire the measurement values obtained by the four or more sensor electrodes. The circuit board is configured to identify two or more sensor electrodes that output, as the measurement values, capacitances that satisfy a reliability standard among the four or more sensor electrodes. The circuit board is configured to calculate a deviation amount of a center position of the base substrate with respect to a center position of the area based on the measurement values of the identified two or more sensor electrodes.

In the measuring method, the measuring system, and the measuring device, the measurement values are obtained by four or more sensor electrodes of the measuring device transferred to the area surrounded by the edge ring. The measurement values indicate the capacitances between the sensor electrodes and the edge ring facing the sensor electrodes, and thus reflect the distances between the sensor electrodes and the edge ring facing the sensor electrodes. Therefore, it is possible to calculate the deviation amount of the center position of the measuring device with respect to the center position of the area surrounded by the edge ring based on the measurement values. In one example, the deviation amount is calculated based on the measurement values of two or more sensor electrodes that output, as the measurement values, capacitances that satisfy the reliability standard among the four or more sensor electrodes. Therefore, the deviation amount between the center of the edge ring and the center of the measuring device can be measured with higher accuracy.

In accordance with an exemplary embodiment of the present disclosure, in the identifying, top two sensor electrodes having large measurement values among the four or more sensor electrodes may be identified as the two or more sensor electrodes. In this configuration, it is possible to easily identify the sensor electrodes that satisfy the reliability standard.

In accordance with an exemplary embodiment of the present disclosure, the four or more sensor electrodes may be an even number of sensor electrodes. In this case, in the identifying, a sensor electrode having a larger measurement value between a pair of sensor electrodes facing each other across a center of the measuring device may be identified as the two or more sensor electrodes. In this configuration, it is possible to easily identify the sensor electrodes that satisfy the reliability standard.

In accordance with an exemplary embodiment of the present disclosure, in the identifying, a sensor electrode that outputs the measurement value greater than or equal to a predetermined threshold may be identified as the two or more sensor electrodes. In this case, the predetermined threshold may be determined based on measurement values measured by the four or more sensor electrodes in a state where the center position of the area and the center position of the measuring device coincide with each other. In this configuration, it is possible to easily identify the sensor electrodes that satisfy the reliability standard.

In accordance with an exemplary embodiment of the present disclosure, the measuring method may further comprise determining whether or not there are two or more sensor electrodes that output the measurement values greater than or equal to the predetermined threshold. In the configuration including four or more sensor electrodes arranged at equal intervals in the circumferential direction, at least two or more sensor electrodes satisfy the reliability standard. Therefore, in the above configuration, the error detection can be performed when the number of sensor electrodes that satisfy the reliability standard is smaller than two.

In accordance with an exemplary embodiment of the present disclosure, in the calculating, when the identified two or more sensor electrodes are three or more sensor electrodes, an average of multiple deviation amounts calculated based on multiple combinations of two sensor electrodes selected from the three or more sensor electrodes may be calculated. In this configuration, the variation in the calculation results are suppressed, and the deviation amount can be measured with higher accuracy.

In accordance with an exemplary embodiment of the present disclosure, the average of the deviation amounts may be a weighted average. In this configuration, the variation in the calculation results are suppressed, and the highly reliable measurement results are easily reflected, which makes it possible to measure the deviation amount with higher accuracy.

Hereinafter, various embodiments will be described in detail with reference to the accompanying drawings. Further, like reference numerals will be used for like or corresponding parts throughout the drawings.

FIG. 1 illustrates a processing system. A processing system 1 includes tables 2a to 2d, containers 4a to 4d, a loader module LM, an aligner AN, load-lock modules LL1 and LL2, process modules PM1 to PM6, a transfer module TF, and a controller MC. The number of the tables 2a to 2d, the number of the containers 4a to 4d, the number of the load-lock modules LL1 and LL2, and the number of the process modules PM1 to PM6 are not limited, and may be any number of one or more.

The tables 2a to 2d are arranged along one edge of the loader module LM. The containers 4a to 4d are placed on the tables 2a to 2d, respectively. Each of the containers 4a to 4d is, for example, a container referred to as a front opening unified pod (FOUP). Each of the containers 4a to 4d is configured to contain an object to be processed W. The object to be processed W has a substantially disc shape, similarly to a wafer.

The loader module LM has a chamber wall defining an atmospheric pressure transfer space therein. A transfer device TU1 is disposed in this transfer space. The transfer device TU1 is, for example, an articulated robot, and is controlled by the controller MC. The transfer device TU1 is configured to transfer the object to be processed W between the containers 4a to 4d and the aligner AN, between aligner AN and the load-lock modules LL1 and LL2, and between the load-lock modules LL1 and LL2 and the containers 4a to 4d.

Figure 2:
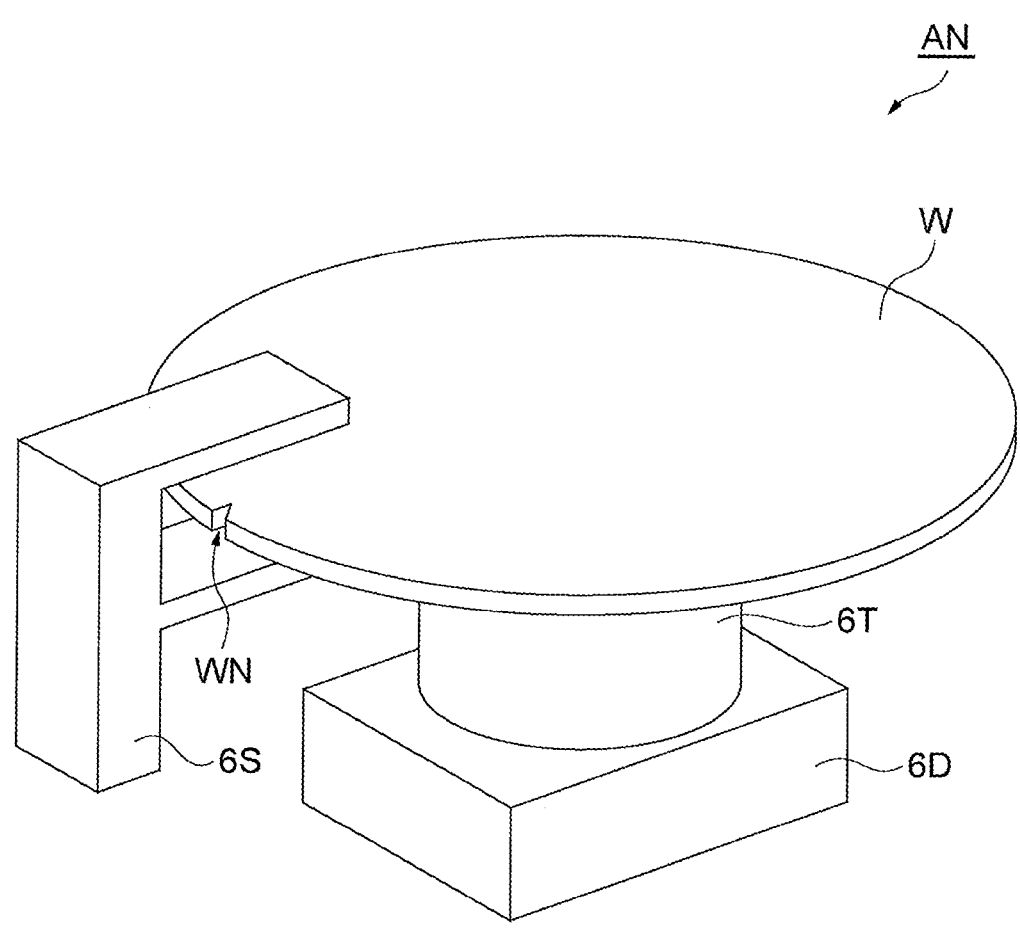
FIG. 2 is a perspective view illustrating an aligner.

The aligner AN is connected to the loader module LM. The aligner AN is configured to adjust (calibrate) the position of the object to be processed W. FIG. 2 is a perspective view illustrating an aligner. The aligner AN has a support 6T, a driving device 6D, and a sensor 6S. The support 6T is a table capable of rotating about an axis extending in a vertical direction, and is configured to support the object to be processed W thereon. The support base 6T is rotated by the driving device 6D. The driving device 6D is controlled by the controller MC. When the support base 6T is rotated by a power from the driving device 6D, the object to be processed W placed on the support base 6T is also rotated.

The sensor 6S is an optical sensor, and detects the edge of the object to be processed W during the rotation of the object to be processed W. The sensor 6S detects the deviation amount of an angular position of a notch WN (or another marker) of the object to be processed W with respect to a reference angular position and the deviation amount of the center position of the object to be processed W with respect to a reference position based on the edge detection result. The sensor 6S outputs the deviation amount of the angular position of the notch WN and the deviation amount of the center position of the object to be processed W to the controller MC. The controller MC calculates the rotation amount of the support 6T that is used for correcting the angular position of the notch WN to the reference angular position based on the deviation amount of the angular position of the notch WN. The controller MC controls the driving device 6D to rotate the support 6T by the calculated rotation amount. Accordingly, the angular position of the notch WN can be corrected to the reference angular position. Further, the controller MC can control the position of the end effector of the transfer device TU1 at the time of receiving the object to be processed W from the aligner AN based on the deviation amount of the center position of the object to be processed W. In this case, the center position of the object to be processed W may coincide with a predetermined position on the end effector of the transfer device TU1.

Referring back to FIG. 1, each of the load-lock modules LL1 and the load-lock module LL2 is disposed between the loader module LM and the transfer module TF. Each of the load-lock modules LL1 and LL2 provides a preliminary decompression chamber.

The transfer module TF is connected to the load-lock modules LL1 and LL2 through gate valves. The transfer module TF provides a decompression chamber that can be decompressed. A transfer device TU2 is disposed in the decompression chamber. The transfer device TU2 is, for example, an articulated robot, and is controlled by the controller MC. The transfer device TU2 is configured to transfer the object to be processed W between the load-lock modules LL1 and LL2 and the process modules PM1 to PM6, and between any two of the process modules PM1 to PM6.

The process modules PM1 to PM6 are connected to the transfer module TF through gate valves. Each of the process modules PM1 to PM6 is a processing apparatus configured to perform dedicated processing such as plasma processing on the object to be processed W.

The following is description of a series of operations performed when the object to be processed W is processed in the processing system 1. The transfer device TU1 of the loader module LM takes out the object to be processed W from any one of the containers 4a to 4d and transfers the object to be processed W to the aligner AN. Next, the transfer device TU1 takes out the object to be processed W whose position has been adjusted from the aligner AN, and transfers the object to be processed W to one of the load-lock modules LL1 and LL2. Thereafter, the one load-lock module reduces a pressure in the preliminary decompression chamber to a predetermined pressure. Then, the transfer device TU2 of the transfer module TF takes out the object to be processed W from the one load-lock module, and transfers the object to be processed W to one of the process modules PM1 to PM6. The object to be processed W is processed in one or more of the process modules PM1 to PM6. Next, the transfer device TU2 transfers the processed object W from the process module to one of the load-lock modules LL1 and LL2. Then, the transfer device TU1 transfers the processed object W from one of the load-lock modules to one of the containers 4a to 4d.

The processing system 1 includes the controller MC as described above. The controller MC may be a computer including a processor, a storage device such as a memory, a display device, an input/output device, a communication device, and the like. The above-described series of operations of the processing system 1 are realized by controlling individual components of the processing system 1 by the controller MC based on the program stored in the storage device.

Figure 3:
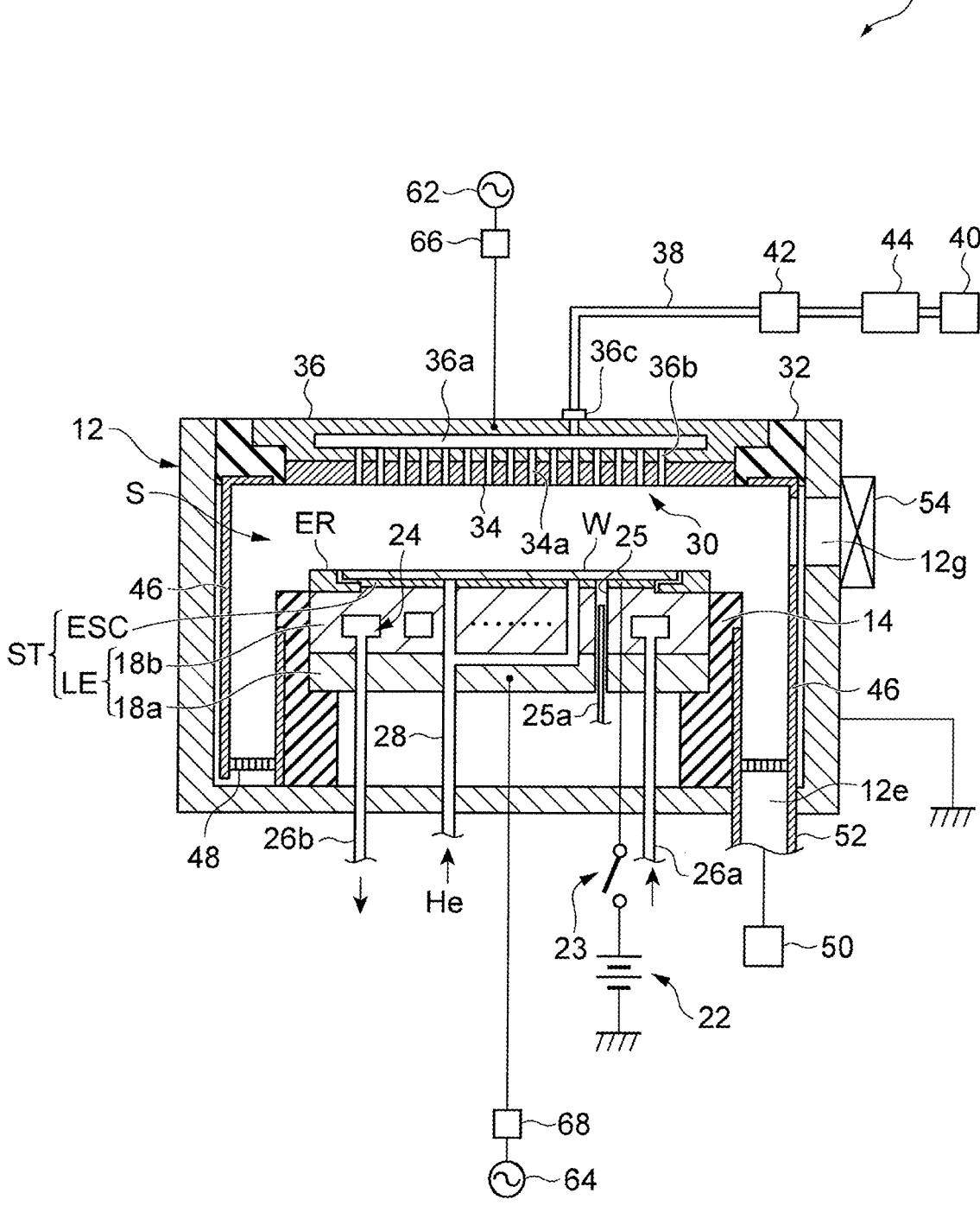
FIG. 3 shows an example of a plasma processing apparatus.

FIG. 3 shows an example of a plasma processing apparatus that may be employed as any of the process modules PM1 to PM6. A plasma processing apparatus 10 shown in FIG. 3 is a capacitively coupled plasma etching apparatus. The plasma processing apparatus 10 includes a substantially cylindrical chamber main body 12. The chamber main body 12 is made of, for example, aluminum, and may have an anodically oxidized inner wall surface. The chamber main body 12 is frame-grounded.

A substantially cylindrical support portion 14 is disposed on the bottom portion of the chamber main body 12. The support portion 14 is made of, for example, an insulating material. The support portion 14 is disposed in the chamber main body 12, and extends upward from the bottom portion of the chamber main body 12. A stage ST is disposed in a chamber S provided by the chamber main body 12. The stage ST is supported by the support portion 14.

The stage ST has a lower electrode LE and an electrostatic chuck ESC. The lower electrode LE includes a first plate 18a and a second plate 18b (placing table). The first plate 18a and the second plate 18b are made of a metal such as aluminum, and have a substantially disc shape. The second plate 18b is disposed on the first plate 18a, and is electrically connected to the first plate 18a.

The electrostatic chuck ESC is disposed on the second plate 18b. The electrostatic chuck ESC has a structure in which an electrode that is a conductive film is embedded between two insulating layers or insulating sheets, and has a substantially disc shape. A DC power supply 22 is electrically connected to the electrodes of the electrostatic chuck ESC through a switch 23. The electrostatic chuck ESC attracts the object to be processed W by an electrostatic force such as a Coulomb force generated by a DC voltage from the DC power supply 22. Accordingly, the electrostatic chuck ESC can hold the object to be processed W.

An edge ring ER is disposed on the peripheral edge of the second plate 18b. The edge ring ER is disposed to surround the edge of the object to be processed W and the electrostatic chuck ESC. The edge ring ER has a first portion P1 and a second portion P2 (see FIG. 6). The first portion P1 and the second portion P2 have an annular plate shape. The second portion P2 is disposed at the outer side of the first portion P1. The thickness of the second portion P2 in the height direction is greater than that of the first portion P1. An inner edge P2i of the second portion P2 has a diameter greater than that of an inner edge P1i of the first portion P1. The object to be processed W is placed on the electrostatic chuck ESC such that its edge region is located on the first portion P1 of the edge ring ER. The edge ring ER may be made of any of various materials such as silicon, silicon carbide, silicon oxide, and the like.

A coolant channel 24 is disposed in the second plate 18b. The coolant channel 24 constitutes a temperature control mechanism. A coolant is supplied to the coolant channel 24 from a chiller unit provided outside the chamber main body 12 through a line 26a. The coolant supplied to the coolant channel 24 is returned to the chiller unit through a line 26b. In this manner, the coolant circulates between the coolant channel 24 and the chiller unit. By controlling the temperature of the coolant, the temperature of the object to be processed W supported by the electrostatic chuck ESC is controlled.

A plurality of (for example, three) through-holes 25 are formed through the stage ST. A plurality of (for example, three) lift pins 25a are inserted into the through-holes 25, respectively. FIG. 3 illustrates one through-hole 25 into which one lift pin 25a is inserted.

The plasma processing apparatus 10 further includes a gas supply line 28. The gas supply line 28 supplies a heat transfer gas such as He gas from a heat transfer gas supply mechanism to a gap between the upper surface of the electrostatic chuck ESC and the backside of the object to be processed W.

The plasma processing apparatus 10 further includes an upper electrode 30. The upper electrode 30 is disposed above the stage ST to face the stage ST. The upper electrode 30 is supported at the upper portion of the chamber main body 12 via an insulating shielding member 32. The upper electrode 30 may include an upper plate 34 and a support body 36. The upper plate 34 faces the chamber S, and is provided with a plurality of gas injection holes 34a. The upper plate 34 may be made of silicon or quartz. Alternatively, the upper plate 34 may be obtained by forming a plasma-resistant film such as yttrium oxide or the like on the surface of a base material made of aluminum.

The support body 36 detachably supports the upper plate 34, and may be made of a conductive material such as aluminum. The support body 36 may have a water cooling structure. A gas diffusion space 36a is disposed in the support body 36. A plurality of gas communication holes 36b communicating with the gas injection holes 34a extend downward from the gas diffusion space 36a. Further, a gas inlet port 36c for introducing a processing gas to the gas diffusion space 36a is formed at the support body 36, and is connected to a gas supply line 38.

A gas source group 40 is connected to the gas supply line 38 through a valve group 42 and a flow rate controller group 44. The gas source group 40 includes multiple gas sources for multiple types of gases. The valve group 42 includes multiple valves, and the flow rate controller group 44 includes multiple flow rate controllers such as mass flow controllers. The gas sources of the gas source group 40 are connected to the gas supply line 38 through corresponding valves of the valve group 42 and corresponding flow rate controllers of the flow controller group 44.

Further, in the plasma processing apparatus 10, a deposition shield 46 is detachably provided along the inner wall of the chamber main body 12. The deposition shield 46 is also provided on the outer periphery of the support portion 14. The deposition shield 46 prevents etching by-products (deposits) from being adhered to the chamber main body 12, and may be formed by coating an aluminum base with ceramic such as yttrium oxide or the like.

At the bottom portion of the chamber main body 12, an exhaust plate 48 is disposed between the support portion 14 and the sidewall of the chamber main body 12. The exhaust plate 48 may be formed by coating an aluminum base with ceramic such as yttrium oxide or the like, for example. A plurality of holes are formed through the exhaust plate 48 in a thickness direction. The chamber main body 12 is provided with an exhaust port 12e at a position below the exhaust plate 48. An exhaust device 50 is connected the exhaust port 12e through an exhaust line 52. The exhaust device 50 has a pressure control valve and a vacuum pump such as a turbo-molecular pump or the like, and can reduce a pressure in the space in the chamber main body 12 to a desired vacuum level. A loading/unloading port 12g for the object to be processed W is disposed on the sidewall of the chamber main body 12, and can be opened and closed by a gate valve 54.

The plasma processing apparatus 10 further includes a first radio frequency (RF) power supply 62 and a second RF power supply 64. The first RF power supply 62 generates a first RF power for plasma generation, and generates an RF power having a frequency within a range of 27 MHz to 100 MHz, for example. The first RF power supply 62 is connected to the upper electrode 30 through a matching device 66. The matching device 66 has a circuit for matching an output impedance of the first RF power supply 62 and an input impedance on a load side (the upper electrode 30 side). Further, the first RF power supply 62 may be connected to the lower electrode LE through the matching device 66.

The second RF power supply 64 generates a second RF power for attracting ions to the object to be processed W, and generates an RF power having a frequency within a range of 400 kHz to 13.56 MHz, for example. The second RF power supply 64 is connected to the lower electrode LE through a matching device 68. The matching device 68 has a circuit for matching an output impedance of the second RF power supply 64 and the input impedance on the load side (the lower electrode LE side).

In the plasma processing apparatus 10, a gas from one or more gas sources selected from the multiple gas sources is supplied to the chamber S. Further, the pressure in the chamber S is set to a predetermined pressure by the exhaust device 50. The gas in the chamber S is excited by the first RF power from the first RF power supply 62. Accordingly, plasma is produced. The object to be processed W is processed by generated active species. If necessary, ions may be attracted to the object to be processed W by the bias power corresponding to the second RF power of the second RF power supply 64.

Figure 4:
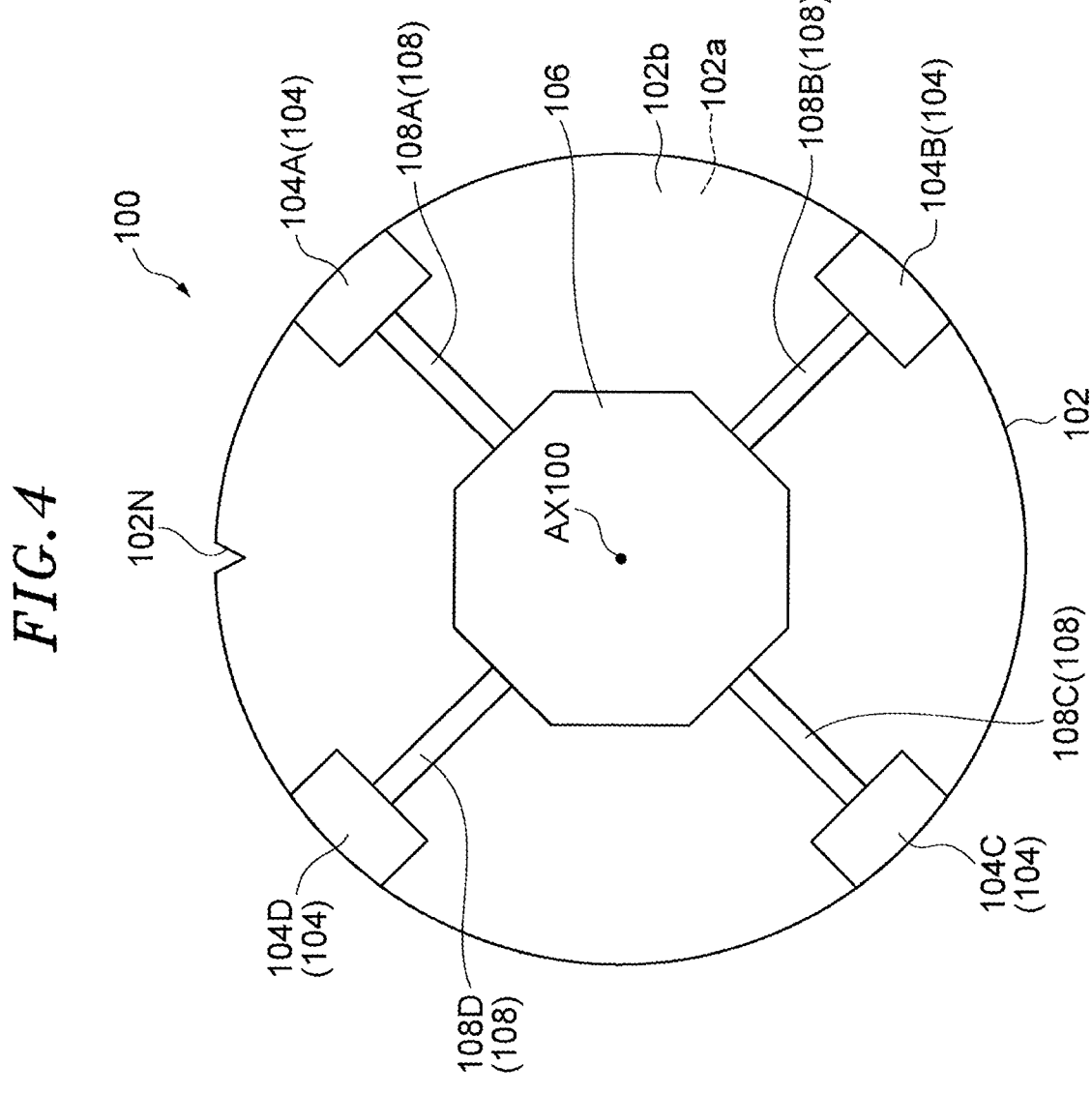
FIG. 4 is a plan view of a measuring device viewed from the top.

Hereinafter, the measuring device will be described. FIG. 4 is a plan view of the measuring device viewed from the top. A measuring device 100 shown in FIG. 4 includes a base substrate 102 having an upper portion 102b and a lower portion 102a. The base substrate 102 is made of silicon, for example, and has the same shape as that of the object to be processed W. In other words, the base substrate 12 has a substantially disc shape. The diameter of the base substrate 102 is the same as that of the object to be processed W. For example, the base substrate 102 has a diameter of 300 mm. The shape and dimension of the measuring device 100 are defined by those of the base substrate 102. Therefore, the measuring device 100 has a shape similar to that of the object to be processed W, and has a dimension similar to that of the object to be processed W. Further, a notch 102N (or another marker) is formed at the edge of the base substrate 102.

A plurality of sensor chips 104A to 104D are disposed at the upper portion 102b of the base substrate 102. The sensor chips 104A to 104D are arranged at regular intervals along the edge of the base substrate 102 in the entire circumference of the edge of the base substrate 102, for example. In other words, the sensor chip 104A and the sensor chip 104C are arranged at symmetrical positions with respect to/across a center axis AX100. The sensor chip 104B and the sensor chip 104D are arranged at symmetrical positions with respect to/across the center axis AX100. Further, in the illustrated example, a notch 102N is formed at an intermediate position between the sensor chip 104A and the sensor chip 104D in the circumferential direction.

A circuit board 106 is disposed at the upper surface of the upper portion 102b of the base substrate 102. The circuit board 106 is provided with wiring groups 108A to 108D for electrical connection to the sensor chips 104A to 104D.

Figure 5:
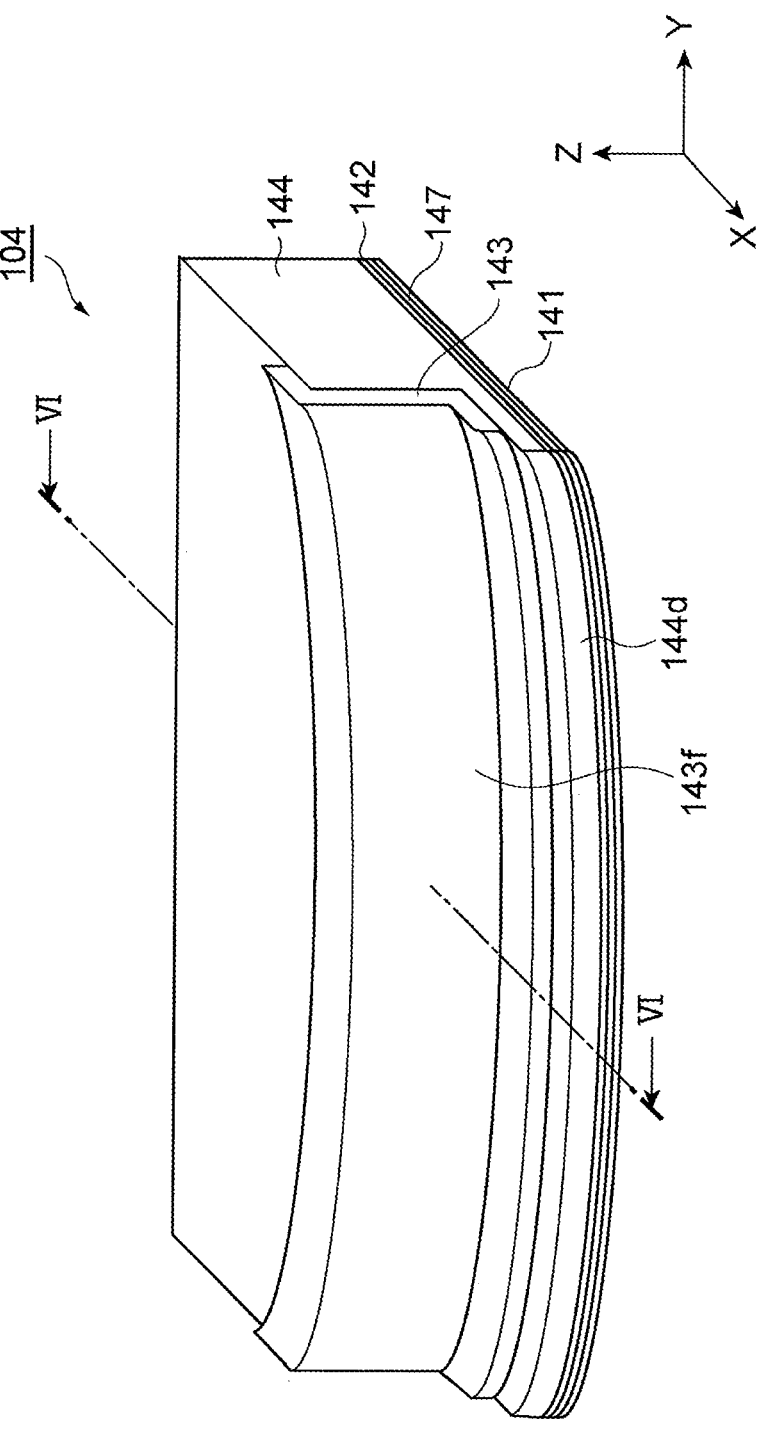
FIG. 5 is a perspective view showing an example of a sensor chip.
Figure 6:
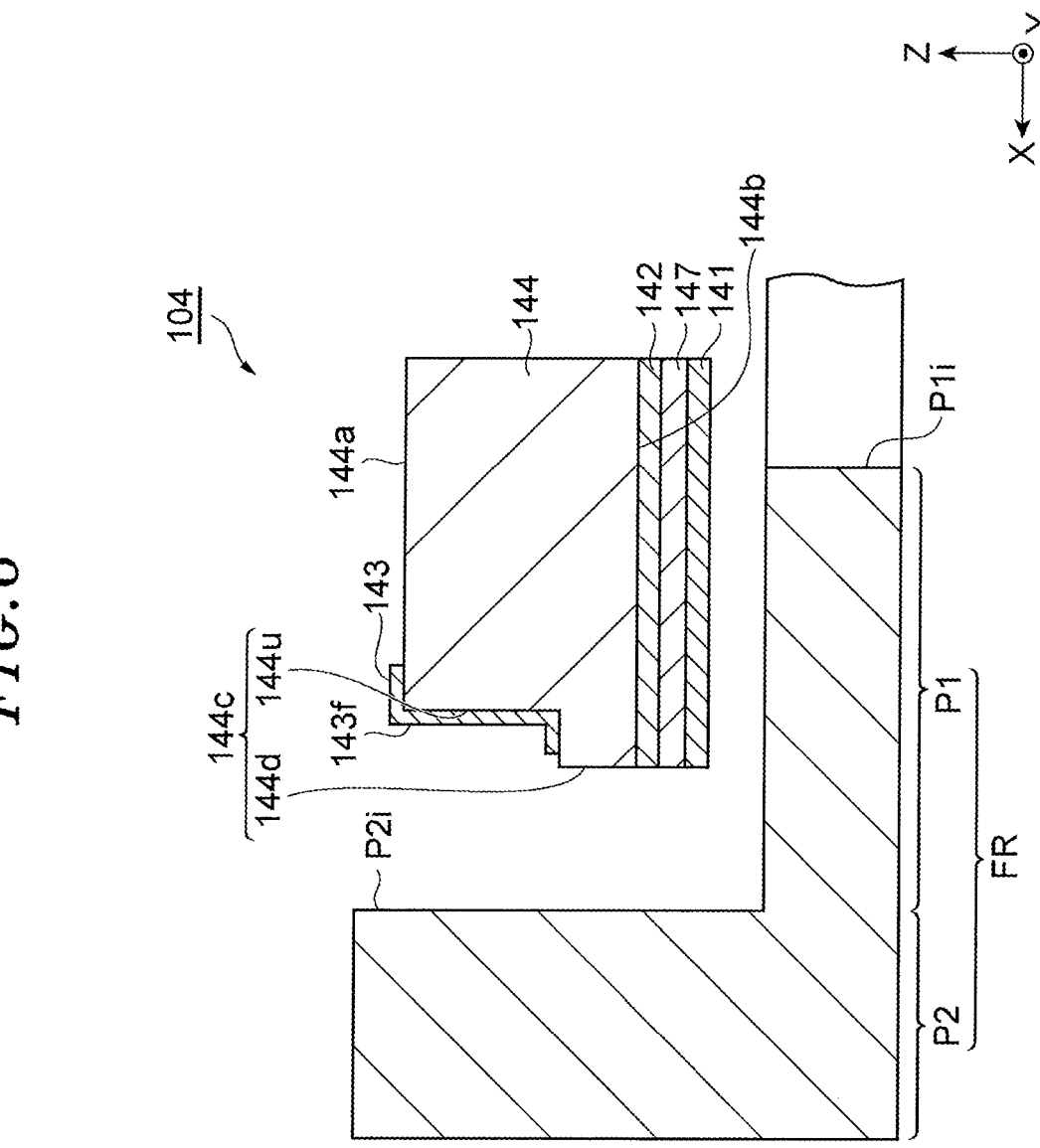
FIG. 6 is a cross-sectional view taken along a line VI-VI of FIG. 5.

FIG. 5 is a perspective view of a sensor chip according to one embodiment. FIG. 6 is a cross-sectional view taken along a line VI-VI of FIG. 5. A sensor chip 104 shown in FIGS. 5 and 6 is used as the sensor chips 104A to 104D of the measuring device 100. In the following description, the XYZ orthogonal coordinate system will be appropriately referred to. The X direction indicates the front direction of the sensor chip 104. The Y direction indicates the width direction of the sensor chip 104, which is one direction perpendicular to the X direction. The Z direction indicates the upward direction of the sensor chip 104, which is the direction perpendicular to the X direction and the Y direction. FIG. 6 shows the edge ring ER as well as the sensor chip 104.

The sensor chip 104 has an electrode 141, a guard electrode 142, a sensor electrode 143, a substrate portion 144, and an insulating region 147.

The substrate portion 144 is made of borosilicate glass or quartz, for example. The substrate portion 144 has an upper surface 144a, a bottom surface 144b, and a front end surface 144c. The guard electrode 142 is disposed below the bottom surface 144b of the substrate portion 144, and extends in the X direction and the Y direction. Further, the electrode 141 is disposed below the guard electrode 142 with the insulating region 147 interposed therebetween, and extends in the X direction and the Y direction. The insulating region 147 is made of, for example, $SiO_2$, Sin, $Al_2O_3$, or polyimide.

The front end surface 144c of the substrate portion 144 has a stepped shape. A lower portion 144d of the front end surface 144c protrudes toward the edge ring ER more than an upper portion 144u of the front end surface 144c. The sensor electrode 143 extends along the upper portion 144u of the front end surface 144c. In one embodiment, the upper portion 144u and the lower portion 144d of the front end surface 144c are curved surfaces having predetermined curvatures. In other words, the upper portion 144u of the front end surface 144c has a constant curvature at any position of the upper portion 144u, and the curvature of the upper portion 144u is the reciprocal of the distance between the central axis AX100 of the measuring device 100 and the upper portion 144u of the front end surface 144c. The lower portion 144d of the front end surface 144c has a constant curvature at any position of the lower portion 144d, and the curvature of the lower portion 144d is the reciprocal of the distance between the central axis AX100 of the measuring device 100 and the lower portion 144d of the front end surface 144c.

The sensor electrode 143 is disposed along the upper portion 144u of the front end surface 144c. In one embodiment, a front surface 143f of the sensor electrode 143 is also curved. In other words, the front surface 143f of the sensor electrode 143 has a constant curvature at any position of the front surface 143f, and the curvature is the reciprocal of the distance between the central axis AX100 of the measuring device 100 and the front surface 143f.

When the sensor chip 104 is used as the sensor of the measuring device 100, the electrode 141 is connected to a wiring 181, the guard electrode 142 is connected to a wiring 182, and the sensor electrode 143 is connected to a wiring 183, as will be described later.

In the sensor chip 104, the sensor electrode 143 is shielded from the portion below the sensor chip 104 by the electrode 141 and the guard electrode 142. Therefore, in the sensor chip 104, it is possible to measure the capacitance direction (X direction) in which the front surface 143f of the sensor electrode 143 faces.

Figure 7:
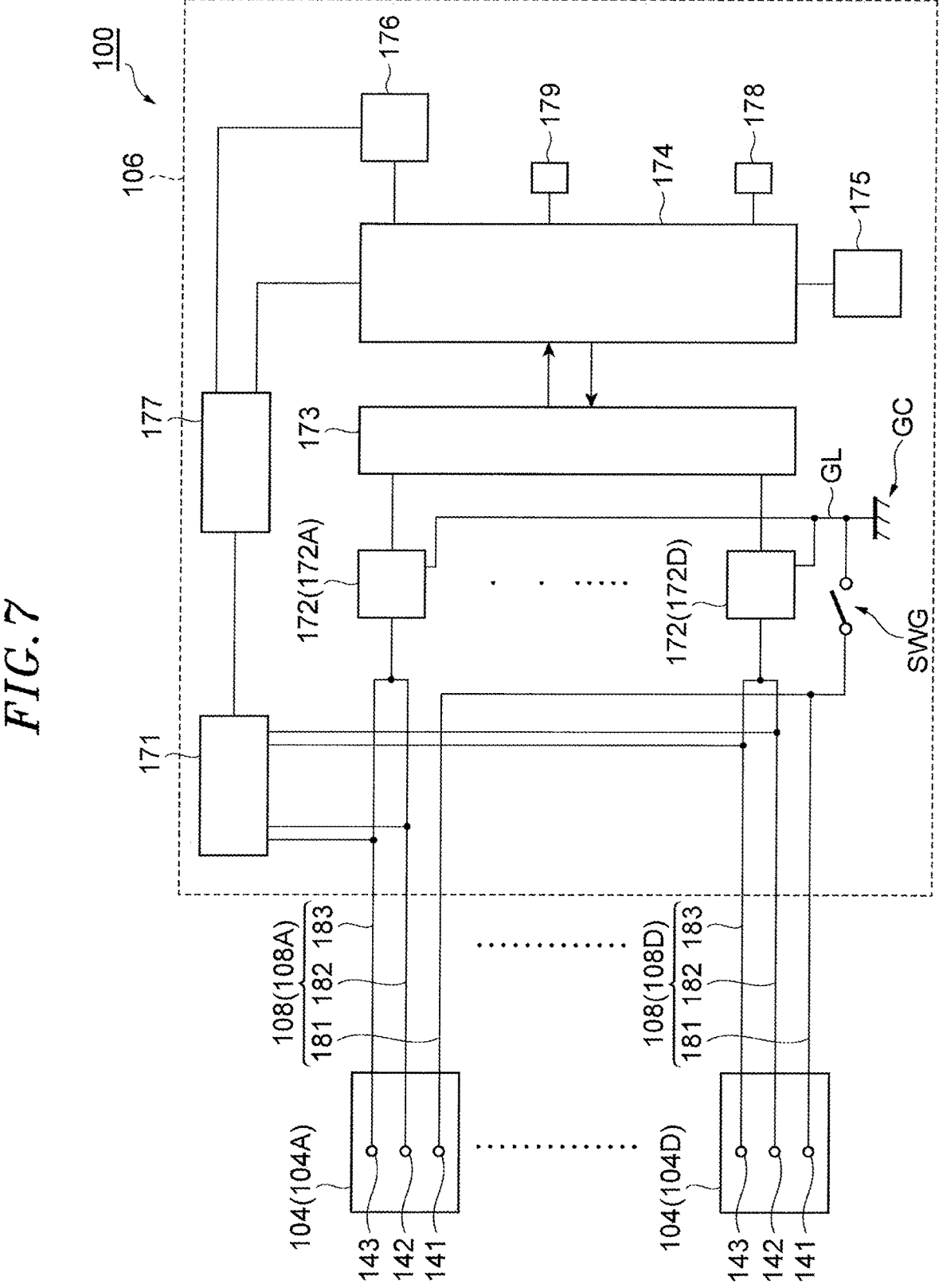
FIG. 7 illustrates a configuration of a circuit board the measuring device.

Hereinafter, the configuration of the circuit board 106 will be described. FIG. 7 shows an example of the configuration of the circuit board of the measuring device. As shown in FIG. 7, the circuit board 106 includes a radio frequency (RF) oscillator 171, a plurality of C/V conversion circuits 172A to 172D, an A/D converter 173, an operation part 174, a storage device 175, a communication device 176, and a power supply 177.

Each of the sensor chips 104A to 104D is connected to the circuit board 106 through a corresponding wiring group among the wiring groups 108A to 108D. Further, each of the sensor chips 104A to 104D is connected to a corresponding C/V conversion circuit among the C/V conversion circuits 172A to 172D through some wirings included in the corresponding wiring group. Hereinafter, one sensor chip 104 having the same configuration as that of each of the sensor chips 104A to 104D will be described. Further, one wiring group 108 having the same configuration as that of each of the wiring groups 108A to 108D will be described. Further, one C/V conversion circuit 172 having the same configuration as that of each of the C/V conversion circuits 172A to 172D will be described.

The wiring group 108 includes the wirings 181 to 183. One end of the wiring 181 is connected to the electrode 141. The wiring 181 is connected to a ground potential line GL connected to a ground G of the circuit board 106. The wiring 181 may be connected to the ground potential line GL through the switch SWG. One end of the wiring 182 is connected to the guard electrode 142, and the other end of the wiring 182 is connected to the C/V conversion circuit 172. One end of the wiring 183 is connected to the sensor electrode 143, and the other end of the wiring 183 is connected to the C/V conversion circuit 172.

The RF oscillator 171 is connected to the power source 177 such as a battery, and is configured to receive a power from the power supply 177 and generate an RF signal. The power supply 177 is also connected to the operation part (processor) 174, the storage device 175, and the communication device 176. The RF oscillator 171 has multiple output lines. The RF oscillator 171 supplies the generated RF signal to the wirings 182 and 183 through the output lines. Therefore, the high frequency oscillator 171 is electrically connected to the guard electrode 142 and the sensor electrode 143 of the sensor chip 104, and the RF signal from the RF oscillator 171 is applied to the guard electrode 142 and the sensor electrode 143.

The wirings 182 and 183 are connected to the input of the C/V conversion circuit 172. In other words, the input of the C/V conversion circuit 172 is connected to the guard electrode 142 and the sensor electrode 143 of the sensor chip 104. The C/V conversion circuit 172 is configured to generate a voltage signal having an amplitude corresponding to the potential difference at its input and output the voltage signal. As the capacitance of the sensor electrode connected to the C/V conversion circuit 172 increases, the magnitude of the voltage of the voltage signal outputted by the C/V conversion circuit 172 increases.

The input of the A/D converter 173 is connected to the output of the C/V conversion circuit 172. Further, the A/D converter 173 is connected to the operation part 174. The A/D converter 173 is controlled by a control signal from the operation part 174, and converts the output signal (voltage signal) of the C/V conversion circuit 172 into a digital value and outputs it as a detection value to the operation part 174.

The storage device 175 is connected to the operation part 174. The storage device 175 is, for example, a volatile memory, and is configured to store measurement data to be described later. Another storage device 178 is connected to the operation part 174. The storage device 178 is, for example, a non-volatile memory, and stores a program that is read and executed by the operation part 174.

The communication device 176 is based on any wireless communication standard. For example, the communication device 176 is based on Bluetooth (Registered Trademark). The communication device 176 is configured to wirelessly transmit the measurement data stored in the storage device 175.

The operation part 174 is configured to control individual components of the measuring device 100 by executing the above-described program. For example, the operation part 174 controls the supply of the RF signal from the RF oscillator 171 to the guard electrode 142, the sensor electrode 143, and the electrode 141. Further, the operation part 174 controls the power supply from the power supply 177 to the storage device 175, the power supply from the power supply 177 to the communication device 176, and the like. Further, the operation part 174 acquires the measurement value obtained by the sensor chip 104 based on the detection value inputted from the A/D converter 173 by executing the above-described program.

In the measuring device 100, the sensor electrodes 143 and the guard electrodes 142 face the inner edge of the edge ring ER in a state where the measuring device 100 is disposed in the area surrounded by the edge ring ER. The measurement value generated based on the potential difference between the signal of the sensor electrodes 143 and the signal of the guard electrode 142 indicates the capacitance that reflects the distance between each of the sensor electrodes 143 and the edge ring ER. The capacitance C is expressed by $C=\varepsilon S/d$, wherein it is assumed that $\varepsilon$ indicates the dielectric constant of the medium between the front surface 143f of the sensor electrode 143 and the inner edge of the edge ring ER; S indicates the area of the front surface 143f of the sensor electrode 143; and d indicates the distance between the front surface 143f of the sensor electrode 143 and the inner edge of the edge ring ER. Therefore, in the measuring device 100, the measurement data that reflects the relative positional relationship between the measuring device 100 that imitates the object to be processed W and the edge ring ER can be obtained. For example, multiple measurement values obtained by the measuring device 100 become smaller as the distance between front surface 143f of sensor electrode 143 and the inner edge of edge ring ER increases.

Hereinafter, an example of a method for determining the deviation amount of the center position (the center axis AX100) of the measuring device 100 disposed in the area with respect to the center position of the area surrounded by the edge ring ER will be described together with the functions of the operation part 174.

Figure 8:
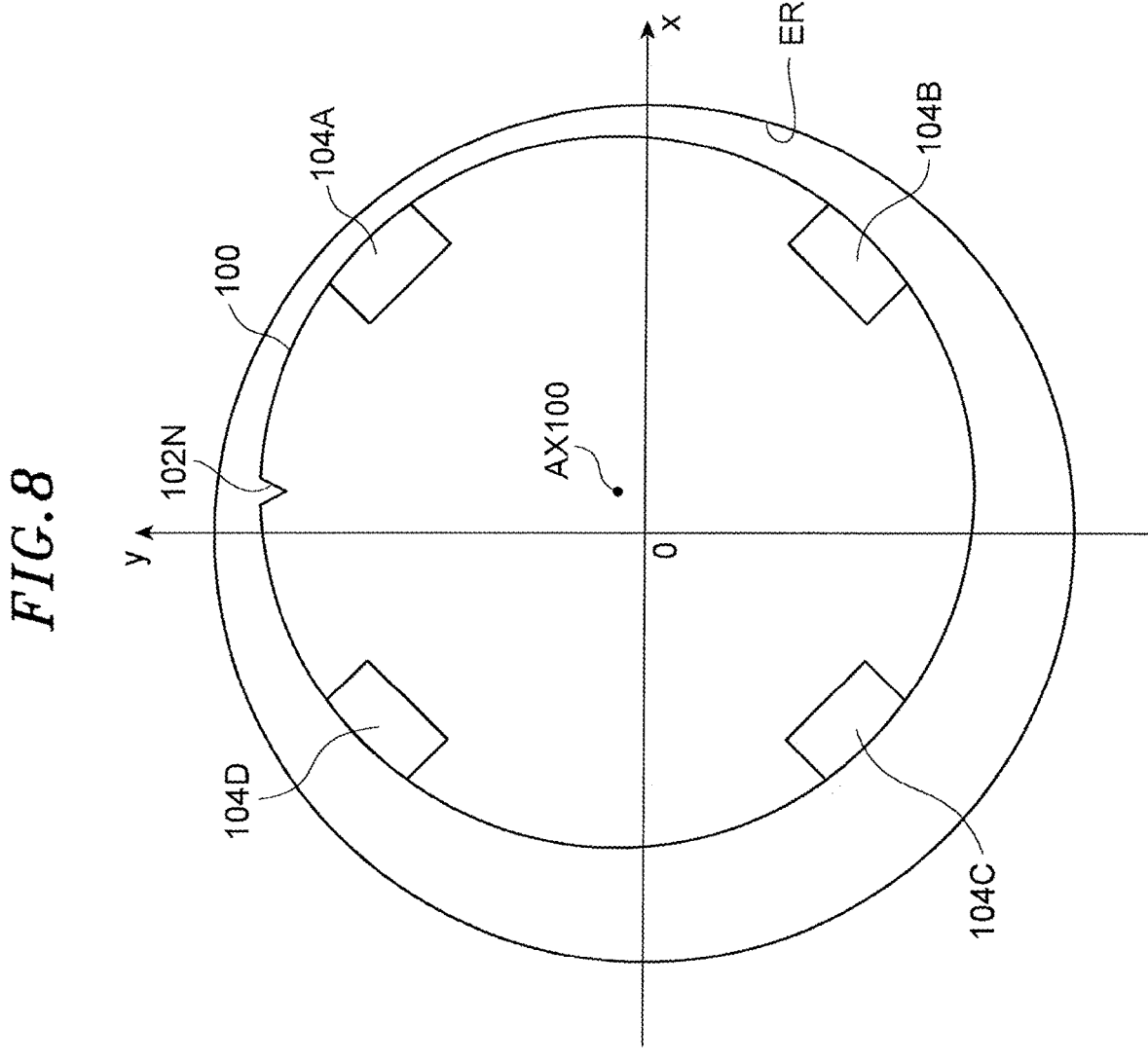
FIG. 8 schematically shows a positional relationship between an edge ring and the measuring device.

FIG. 8 schematically shows a positional relationship between the edge ring ER and the measuring device 100 disposed at the inner side of the edge ring ER. In FIG. 8, the inner circumference of the edge ring ER and the edge of the measuring device 100 are illustrated. Further, FIG. 8 shows orthogonal coordinate system defined by the X-axis and the Y-axis and having the center position of the edge ring ER as the origin. The illustrated example shows a state in which the measuring device 100 is deviated from the reference position. The reference position is a position where the center axis AX100 of the measuring device 100 coincides with the origin of the orthogonal coordinate system and the notch 102N of the measuring device 100 overlaps a position on the Y-axis.

Figure 9:
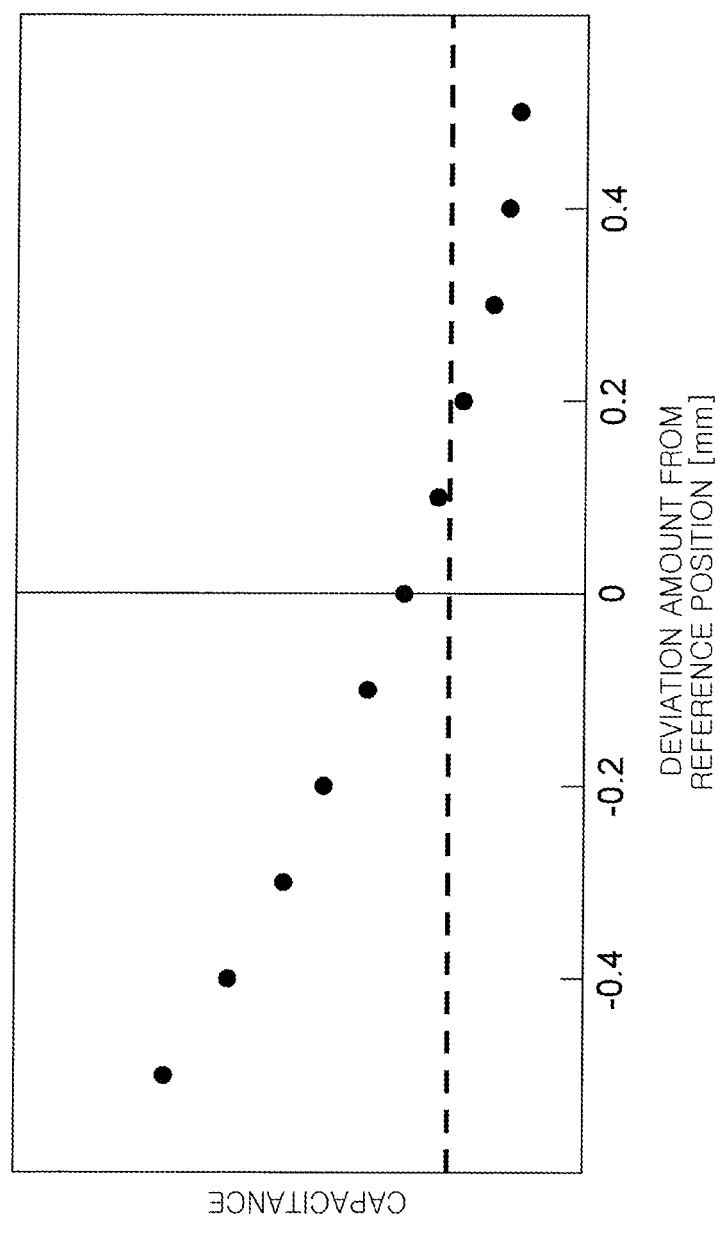
FIG. 9 is an example of a graph showing the relationship between a distance between the sensor chip and the edge ring and a measured capacitance.

FIG. 9 is an example of a graph showing the relationship (sensor characteristics) between the distance from the sensor chip 104 to the edge ring ER and the capacitance measured by the sensor chip 104. In this graph, the distance from the sensor chip 104 to the edge ring ER at the reference position is zero. In other words, the horizontal axis of the graph represents the deviation amount of the sensor chip from the reference position. The direction in which the sensor chip 104 becomes close to the edge ring ER is a negative direction, and the direction in which the sensor chip 104 becomes distant from the edge ring ER is a positive direction. As described above, the measurement value becomes smaller as the distance between the sensor chip 104 and the edge ring ER increases. As shown in FIG. 9, the ratio of the change in the measurement value with respect to the change in the distance is greater when the sensor chip 104 is close to the edge ring ER than when the sensor chip 104 is distant from the edge ring ER. In other words, the reliability of the distance detection by the sensor chip 104 increases as the sensor chip 104 becomes close to the edge ring ER. Further, the reliability of the measurement value obtained by the sensor chip 104 distant from the edge ring ER decreases due to a high noise ratio. Therefore, in the measuring system according to one exemplary embodiment, the deviation amount of the measuring device is calculated based on the capacitance obtained by the sensor chip 104 having high detection reliability.

Figure 10:
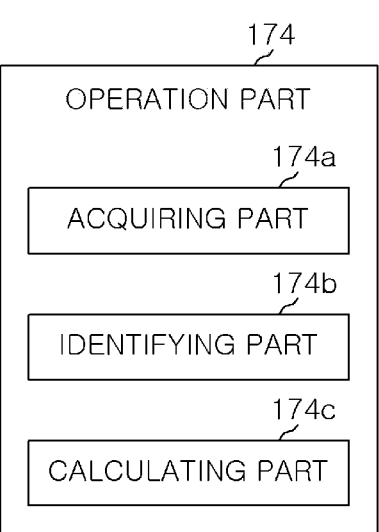
FIG. 10 is a block diagram for explaining functions of an operation part.

FIG. 10 is a block diagram for explaining the functions of the operation part 174 mounted on the circuit board 106 of the measuring device 100. As shown in FIG. 10, the operation part 174 includes an acquiring part 174a, an identifying part 174b, and a calculating part 174c. The acquiring part 174a acquires the measurement values indicating the capacitances detected by the sensor chips 104A to 104D. For example, the acquiring part 174a can acquire the measurement values from the sensor chips 104A to 104D when the measuring device 100 is transferred to the inner area of the edge ring ER by the transfer device TU2.

The identifying part 174b identifies two or more sensor chips that output, as the measurement values, the capacitances that satisfy the reliability standard among the sensor chips 104A to 104D. Here, the reliability standard may be the standard for determining whether or not the measurement value is reliable in calculating the deviation amount, or may be the standard for estimating a sensor chip with relatively little noise among the sensor chips 104 of the measuring device 100. In this case, the standard for determining low noise can be replaced by the standard for determining high measurement value. In other words, an exemplary reliability standard may be the standard for selecting the sensor chip 104 having a relatively large measurement value among the sensor chips 104 of the measuring device 100. When the sensor chips 104 are divided into a large measurement value group, an intermediate measurement value group, a small measurement value group based on the magnitude of the measurement value, for example, "the sensor chip having a relatively large measurement value" may not belong to at least the small measurement value group.

As exemplary identifying part 174b may identify top two sensor chips having large measurement values among the four sensor chips 104A to 104D as the sensor chips that satisfy the reliability standard. In the example of FIG. 8, the sensor chips 104A and 104B are closer to the edge ring ER compared to the sensor chips 104C and 104D, so that the measurements values of the sensor chips 104A and 104B are greater than those of the sensor chips 104C and 104D. Therefore, the sensor chips 104A and 104B are identified as the sensor chips that satisfy the reliability standard.

Further, the identifying part 174b may identify, as the sensor chip that satisfies the reliability standard, the sensor chip having a larger measurement value between a pair of sensor chips facing each other with respect to the center of the measuring device 100. This method can be employed when an even number of sensor chips are arranged at equal intervals in the circumferential direction. In the example of FIG. 8, between the sensor chip 104A and the sensor chip 104C facing each other, the sensor chip 104A is closer to the edge ring ER. Between the sensor chip 104B and the sensor chip 104D facing each other, the sensor chip 104B is closer to the edge ring ER. Therefore, the sensor chips 104A and 104B are identified as the sensor chips that satisfy the reliability standard.

The identifying part 174b may identify, as the sensor chip that satisfies the reliability standard, the sensor chip that outputs the measurement value greater than or equal to a predetermined threshold value. In this case, the predetermined threshold value may be determined based on the measurement value measured by the sensor chip 104 in a state (reference state) where the center position of the edge ring ER and the center position of the measuring device 100 coincide with each other. In the reference state, the same measurement value is obtained in all the sensor chips 104, so that the threshold value may be determined based on the measurement value of any one sensor chip 104. Alternatively, the threshold value may be determined based on the average value of the measurement values of all the sensor chips 104.

The threshold value may be the measurement value of the sensor chip 104 in the reference state. When the measurement value of the sensor chip 104 in the reference state is used as the threshold value, if the deviation amount is small, there may be no sensor chip 104 whose measurement value exceeds the threshold value. Therefore, the threshold value may be smaller than the measurement value of the sensor chip 104 in the reference state, as indicated by the dashed line in FIG. 9.

When the identifying part 174b has a threshold value, the identifying part 174b may determine whether or not there are two or more sensor chips that output the measurement values greater than or equal to the threshold value. When four or more sensor chips 104 are arranged at regular intervals in the circumferential direction, the measurement values of two or more sensor chips 104 exceed the threshold value regardless of the arrangement of the measuring device 100. Therefore, if it is determined that there is not two or more sensor chips that output the measurement values greater than or equal to the threshold value in a state where the measuring device 100 is transferred into the area surrounded by the edge ring ER, it is considered that a certain error has occurred. The identifying part 174b may notify the occurrence of the error. The circuit board 106 may be provided with a notifying part 179 for error notification. The notifying part 179 may be, for example, a communication device that transmits the error notification to an external system in a wireless manner or the like, for example.

Figure 11:
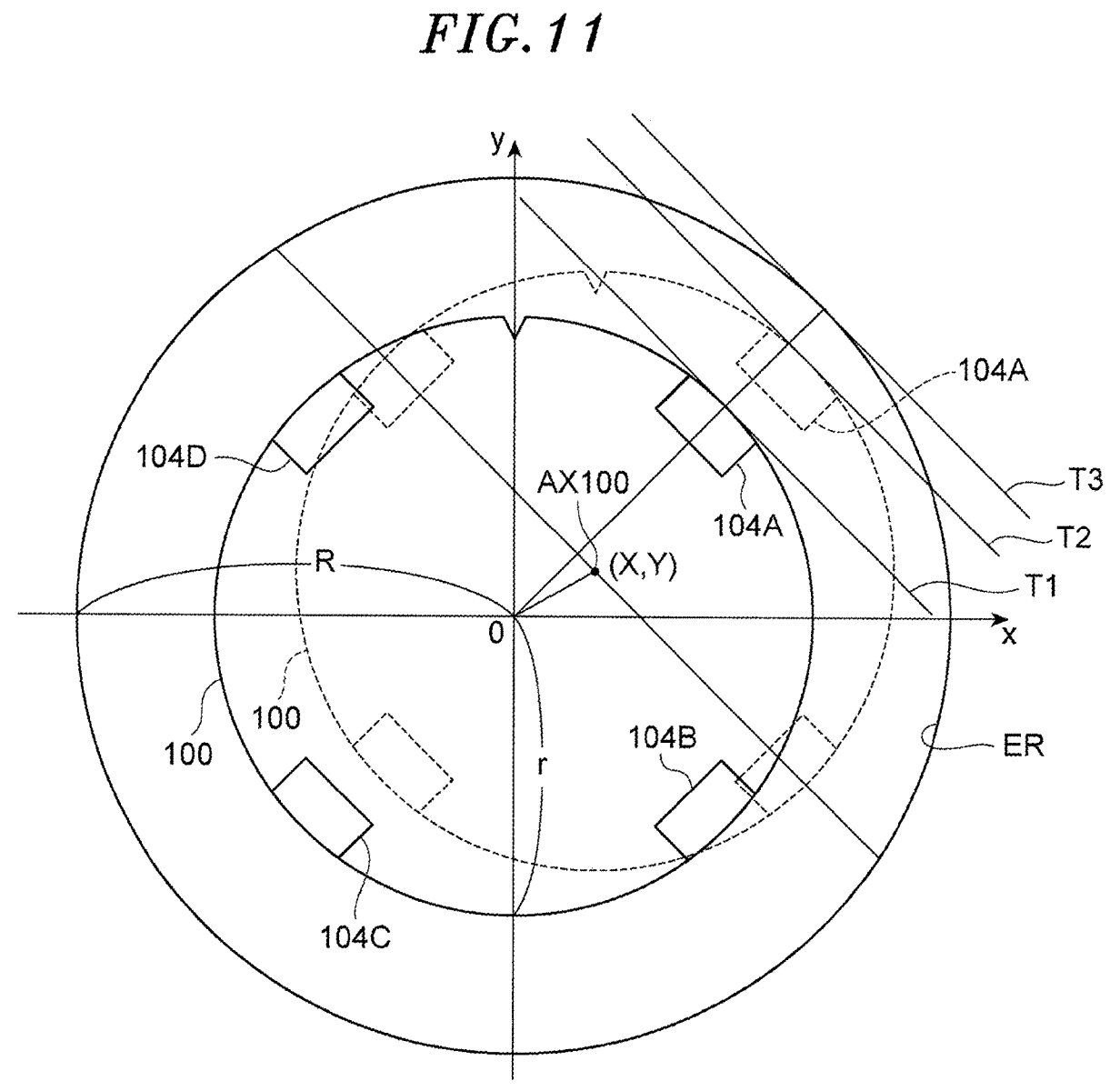
Figure 12:
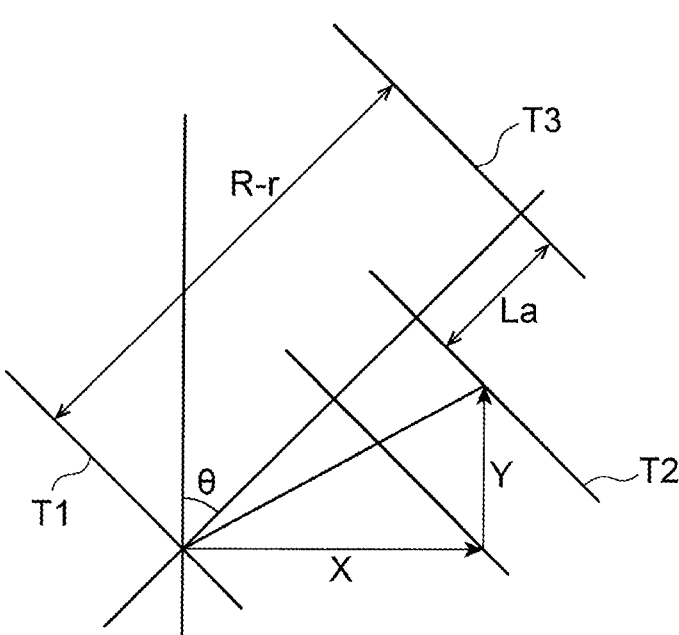
FIG. 12 explains an example of an operation for calculating a deviation amount, and schematically shows the relationship between a distance between the edge ring and the sensor chip and coordinates of the measuring device.

The calculating part 174c calculates the deviation amount based on the measurement values of the two or more sensor chips 104 identified by the identifying part 174b. In the example of FIG. 8, the deviation amount is calculated based on the measurement values of the sensor chips 104A and 104B. FIGS. 11 and 12 explain an example of an operation for calculating the deviation amount. Similarly to FIG. 8, FIG. 11 shows the inner circumference of the edge ring ER, the edge of the measuring device 100, and the orthogonal coordinate system defined by the X-axis and the Y-axis and having the center position of the edge ring ER as the origin. Further, the measuring device 100 located at the reference position is indicated by the solid line, and the measuring device deviated from the reference position is indicated by the dashed line. Further, in FIG. 11, a tangent line T1 in contact with the sensor chip 104A of the measuring device 100 at the reference position, and a tangent line T2 in contact with the sensor chip 104A of the measuring device 100 at the deviated position are illustrated. In addition, a tangent line T3 in contact with a portion of the inner circumference of the edge ring ER that faces the sensor chip 104A is illustrated.

FIG. 12 focuses on the sensor chip 104A in FIG. 11, and shows the relationship between the distance between the sensor chip 104A and the edge ring ER and the coordinates of the center of the measuring device 100. In FIG. 12, the tangent lines T1, T2 and T3 of FIG. 11 are illustrated. In this case, the distance from the tangent line T1 to the tangent line T3 in the radial direction is the length obtained by subtracting a radius r of the measuring device 100 from a radius R of the inner circumference of the edge ring ER. Further, the distance from the tangent line T2 to the tangent line T3 in the radial direction is a distance La between the sensor chip 104A and the edge ring ER. When the coordinates of the center axis AX100 of the measuring device 100 are (X, Y), the distance La is expressed by the following Eq. (1). Further, in Eq. (1), the change in the distance between the sensor chip 104A and the edge ring ER, which is caused by the movement of the measuring device 100 in the direction of the tangent line T2, is not considered. In the example shown in FIG. 12, the angle $\theta$ is 45°, and the following Eqs. (1) to (12) correspond to the angle $\theta$.

$$L_a = R - r - \frac{1}{\sqrt{2}}X - \frac{1}{\sqrt{2}}Y \qquad \text{Eq. (1)}$$

Similarly, a distance Lb between the sensor chip 104B and the edge ring ER, a distance Lc between the sensor chip 104C and the edge ring ER, and a distance Ld between the sensor chip 104D and the edge ring ER are expressed by the following Eqs. (2) to (4).

$$L_b = R - r - \frac{1}{\sqrt{2}}X + \frac{1}{\sqrt{2}}Y \qquad \text{Eq. (2)}$$

$$L_c = R - r + \frac{1}{\sqrt{2}}X + \frac{1}{\sqrt{2}}Y \qquad \text{Eq. (3)}$$

$$L_d = R - r + \frac{1}{\sqrt{2}}X - \frac{1}{\sqrt{2}}Y \qquad \text{Eq. (4)}$$

Therefore, the X coordinate and Y coordinate indicating the deviation amount of the measuring device 100 are obtained by the following Eqs. (5) and (6) based on the above Eqs. (1) and (2).

$$X = \frac{1}{\sqrt{2}}(2R - 2r - L_a - L_b) \qquad \text{Eq. (5)}$$

$$Y = -\frac{1}{\sqrt{2}}(L_a - L_b) \qquad \text{Eq. (6)}$$

Further, the X-coordinate and Y-coordinate indicating the deviation amount of the measuring device 100 may be obtained by the following Eqs. (7) and (8) based on the above Eqs. (2) and (3).

$$X = -\frac{1}{\sqrt{2}}(L_b - L_c) \qquad \text{Eq. (7)}$$

$$Y = -\frac{1}{\sqrt{2}}(2R - 2r - L_b - L_c) \qquad \text{Eq. (8)}$$

Further, the X-coordinate and Y-coordinate indicating the deviation amount of the measuring device 100 may be obtained by the following Eqs. (9) and (10) based on the above Eqs. (3) and (4).

$$X = -\frac{1}{\sqrt{2}}(2R - 2r - L_c - L_d) \qquad \text{Eq. (9)}$$

$$Y = \frac{1}{\sqrt{2}}(L_c - L_d) \qquad \text{Eq. (10)}$$

Further, the X-coordinate and Y-coordinate indicating the deviation amount of the measuring device 100 may be obtained by the following Eqs. (11) and (12) based on the above Eqs. (4) and (1).

$$X = -\frac{1}{\sqrt{2}}(L_a - L_d) \qquad \text{Eq. (11)}$$

$$Y = \frac{1}{\sqrt{2}}(2R - 2r - L_a - L_d) \qquad \text{Eq. (12)}$$

In the example of FIG. 8, the sensor chips 104A and 104B are identified as the sensor chips that satisfy the reliability standard. Therefore, the calculating part 174c calculates coordinate data indicating the deviation amount of the measuring device 100 based on the above Eqs. (5) and (6). In one example, the calculating part 174 stores data indicating the sensor characteristics, such as the data shown in FIG. 9. The calculating part 174 may store a table having sensor characteristic data obtained in advance for each of the sensor chips 104A to 104D. The calculating part 174c can convert the measurement value of the sensor chip 104 into the distance from the sensor chip 104 to the edge ring ER based on the stored sensor characteristic data. For example, the calculating part 174c acquires the value of the distance La based on the sensor characteristic data of the sensor chip 104A and the detection value acquired by the sensor chip 104A. The calculating part 174c may obtain the distance value corresponding to the measurement value of the sensor chip by linearly interpolating the sensor characteristic data.

As described above, in one exemplary embodiment, the deviation amount between the center position of the edge ring ER and the central axis AX100 of the measuring device 100 disposed at the inner side of the edge ring ER can be calculated as the X coordinate and the Y coordinate.

Figure 13:
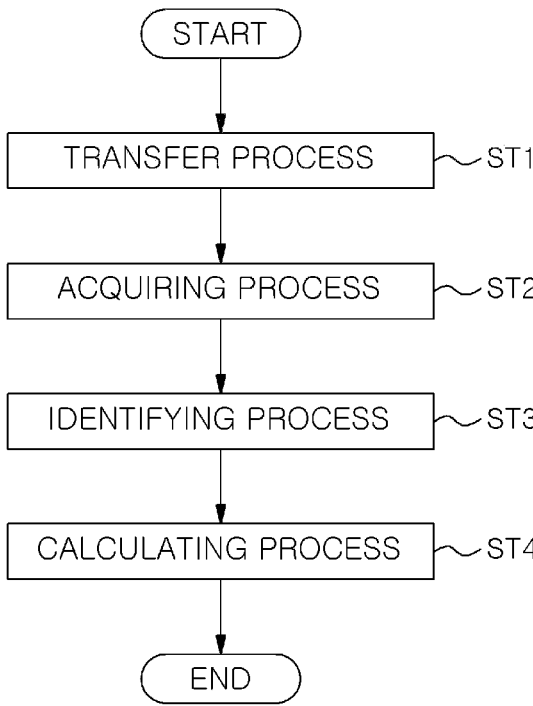
FIG. 13 is a flowchart of a measuring method performed by a measuring system.

Hereinafter, the operation method of the measuring system including the processing system 1 and the measuring device 100 will be described. As described above, the transfer device TU2 in the processing system 1 is controlled by the controller MC. In one embodiment, the transfer device TU2 can transfer the object to be processed W and the measuring device 100 to the inner area of the edge ring ER based on transfer position data transmitted from the controller MC. FIG. 13 is a flowchart showing the flow of the measuring method performed by the measuring system.

As shown in FIG. 13, in the measuring system, a transfer process of transferring the measuring device to a position in the area specified by the transfer position data using a transfer device is performed (step ST1). In step ST1, the measuring device 100 is transferred by the transfer device TU2 to the inner area of the edge ring ER that is specified by the transfer position data. Specifically, the transfer device TU1 transfers the measuring device 100 to one of the load-lock modules LL1 and LL2. Then, the transfer device TU2 transfers the measuring device 100 from the one load-lock module to one of the process modules PM1 to PM6 based on the transfer position data, and locates the measuring device 100 on the electrostatic chuck ESC. The transfer position data is, for example, coordinate data that is predetermined such that the position of the center axis AX100 of the measuring device 100 coincides with the center position of the edge ring ER.

Next, an acquiring process of acquiring the measurement values using four or more sensor chips 104 of the measuring device 100 transferred into the area is performed (step ST2). Specifically, the measuring device 100 acquires multiple digital values (measurement values) corresponding to the magnitudes of the capacitances between the edge ring ER and the sensor electrodes 143 of the sensor chips 104A to 104D, and stores the digital values in the storage device 175. The multiple digital values may be acquired at predetermined timings under the control of the operation part 174.

Next, an identifying process of identifying two or more sensor chips 104 that output, as the measurement values, capacitances that satisfy the reliability standard among the four or more sensor chips 104 is performed (step ST3). In step ST3, among the four sensor chips 104A to 104D, top two or more sensor chips having large measurement values are identified.

Then, a calculating process of calculating the deviation amount based on the measurement values of the identified two or more sensor chips 104 is performed (step ST4). In step ST4, the deviation amount between the center position of the edge ring ER and the center position of the measuring device 100 is obtained from the measurement value of the sensor chip 104 identified in step ST3 using the above-described method for obtaining the deviation amount. In step ST4, the data of the obtained deviation amount may be transmitted to the controller MC. In this case, the controller MC may correct the transfer position data based on the received deviation amount data to offset the deviation amount.

As described above, in one exemplary embodiment, there is provided a method for measuring the deviation amount of measuring device 100 transferred by the transfer device TU2. The measuring device 100 includes the disc-shaped base substrate 102, and the four or more sensor electrodes 143 arranged at equal intervals along the edge of the base substrate in the circumferential direction 102 and configured to measure capacitances between the sensor electrodes 143 and an object disposed at a lateral side. The transfer device TU2 transfers the object to be processed W into the area surrounded by the edge ring ER based on the transfer position data. The deviation amount is the amount of deviation of the center position of the measuring device 100 with respect to the center position of the area. The measuring method includes the process of transferring the measuring device 100 to a position in the area specified by the transfer position data using the transfer device TU2. The measuring method includes the process of acquiring the measurement values using four or more sensor electrodes 143 of the measuring device 100 transferred into the area. The measuring method includes the process of identifying two or more sensor electrodes 143 that output, as the measurement values, capacitances that satisfy the reliability standard among the four or more sensor electrodes 143. The measuring method includes the process of calculating the deviation amount based on the measurement values of the identified two or more sensor electrodes 143.

In the above measuring method, the measurement values are acquired by four or more sensor electrodes 143 of the measuring device 100 transferred to the area surrounded by the edge ring ER. The measurement values indicate the capacitances between the sensor electrodes 143 and the edge ring ER facing the sensor electrodes 143, and thus reflects the distances between the sensor electrodes 143 and the edge ring ER facing the sensor electrodes 143. Therefore, it is possible to calculate the deviation amount of the center position of the measuring device 100 with respect to the center position of the area surrounded by the edge ring ER based on the measurement values.

However, the ratio of the change in the measurement value with respect to the change in the distance to the edge ring ER is greater when the sensor electrode 143 is closer to the edge ring ER than when the sensor electrode 143 is distant from the edge ring ER, as shown in FIG. 9. In other words, the reliability of the distance detection by the sensor electrode 143 is improved as the sensor electrode 143 is closer to the edge ring ER. Further, the measurement value obtained by the sensor electrode 143 distant from the edge ring ER has low reliability due to a high noise ratio. Therefore, when the deviation amount is calculated based on the measurement values of all the sensor electrodes 143 of the measuring device 100, the deviation amount may be calculated with low accuracy.

In one exemplary embodiment, the deviation amount is calculated based on the measurement values of two or more sensor electrodes 143 that output, as the measurement values, capacitances that satisfy the reliability standard among the four or more sensor electrodes 143. In other words, the measurement value of the sensor electrode 143 that does not satisfy the reliability standard is not used for calculating the deviation amount. Therefore, the deviation amount between the center of the edge ring ER and the center of the measuring device 100 can be measured with higher accuracy.

In one exemplary embodiment, in the identifying step, top two sensor electrodes 143 having large measurement values among the four or more sensor electrodes may be identified as the two or more sensor electrodes 143. In this configuration, the sensor electrodes 143 that satisfy the reliability standard can be easily identified.

In one exemplary embodiment, the four or more sensor electrodes 143 may be an even number of sensor electrodes 143. In this case, in the identifying step, the sensor electrode 143 having a larger measurement value between a pair of sensor electrodes 143 facing each other with respect to the center of the measuring device 100 may be identified as the two or more sensor electrodes 143. In this configuration, the sensor electrodes 143 that satisfy the reliability standard can be easily identified.

In one exemplary embodiment, in the identifying step, the sensor electrodes 143 that output the measurement values greater than or equal to a predetermined threshold value may be identified as the two or more sensor electrodes 143. In this case, the predetermined threshold value may be determined based on the measurement values measured by the four or more sensor electrodes 143 in a state where the central position of the area and the central position of the measuring device 100 coincide with each other. In this configuration, the sensor electrodes 143 that satisfy the reliability standard can be easily identified.

In one exemplary embodiment, the measuring method may further include a process of determining whether or not there are two or more sensor electrodes 143 that output the measurement values greater than or equal to a predetermined threshold value. In a configuration having four or more sensor electrodes 143 arranged at equal intervals in the circumferential direction, at least two or more sensor electrodes 143 satisfy the reliability standard. Therefore, in the above configuration, the error detection can be performed when the number of such sensor electrodes 143 is less than two.

While the embodiments have been described, the present disclosure is not limited to the above-described embodiments, and various modifications can be made.

Figure 14:
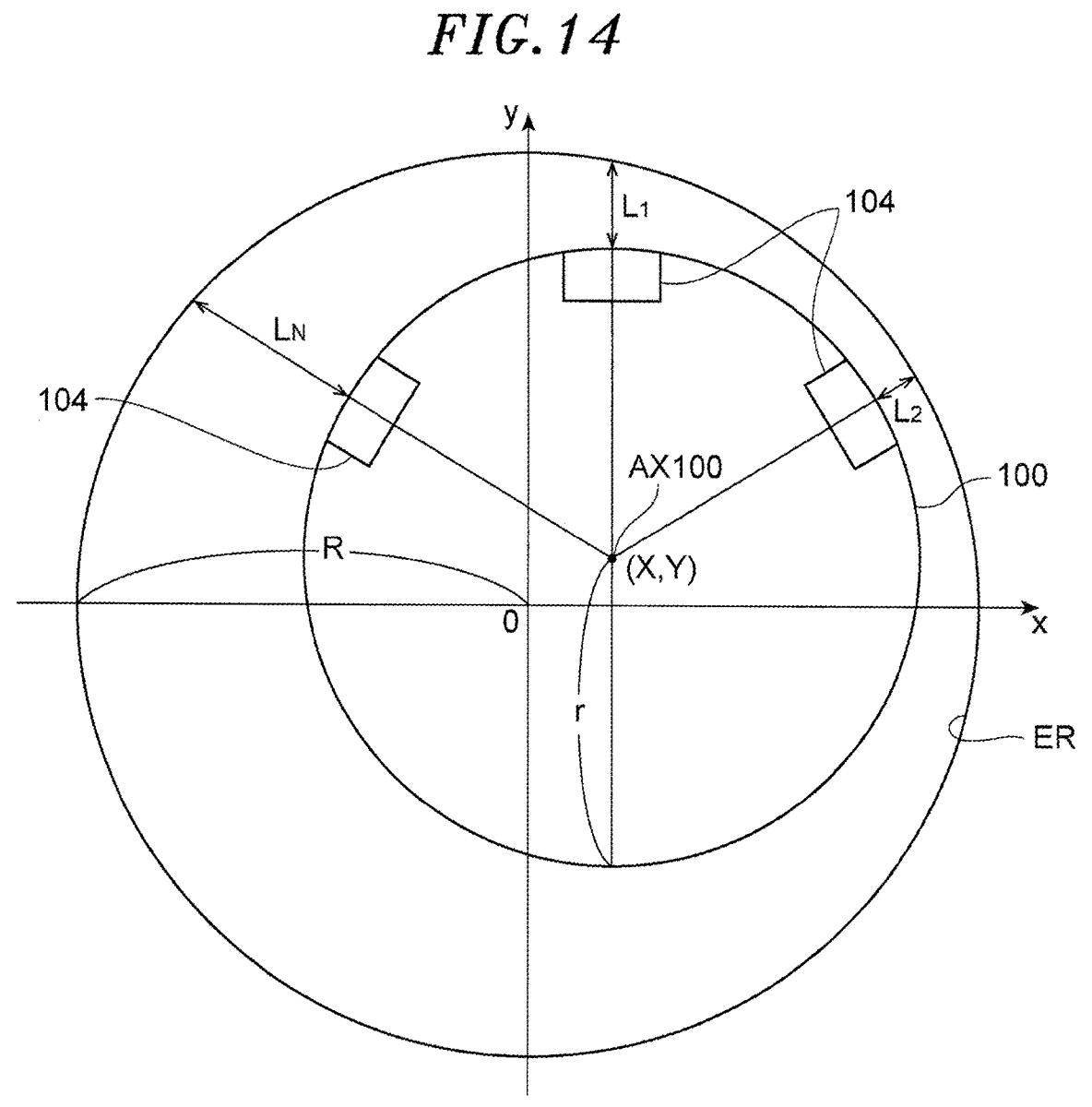
Figure 15:
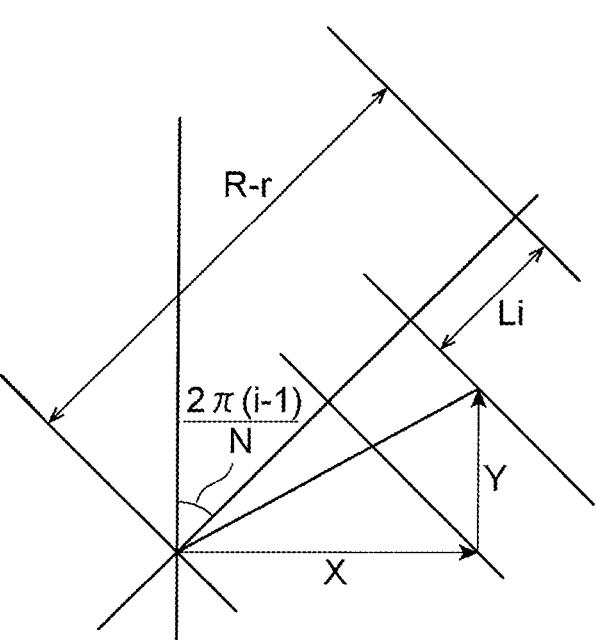
FIG. 15 explains an example of an operation for calculating a deviation amount, and schematically shows the relationship between a distance between the edge ring and the sensor chip and coordinates of the measuring device.

For example, the number of sensor chips 104 of the measuring device 100 is not limited to four. FIGS. 14 and 15 explain an example of an operation for calculating the deviation amount. FIG. 14 shows the inner circumference of the edge ring ER, the edge of the measuring device 100, and the orthogonal coordinate system defined by the X-axis and the Y-axis and having the center position of the edge ring ER as the origin. As shown in FIG. 14, the measuring device 100 has N-number of sensor chips 104 arranged at regular intervals in the circumferential direction. The distances between the N-number of sensor chips 104 and the edge ring ER are indicated as $L_1, L_2, \ldots, L_N$ in a clockwise direction from the 12 o'clock position. In FIG. 14, the sensor chips and the distances corresponding to the distance $L_3$ and subsequent distances are not illustrated.

FIG. 15 focuses on an arbitrary sensor chip of FIG. 14, and shows the relationship between the distance between the sensor chip 104 and the edge ring ER and the coordinates of the center of the measuring device 100. Similarly to FIG. 12, in FIG. 14, the tangents T1, T2 and T3 are illustrated. In this case, when the coordinates of the center axis AX100 of the measuring device 100 are (X, Y), a distance $L_i$ between an $i^{th}$ sensor chip 104 and the edge ring ER is expressed by the following Eq. (13). Eq. (14) is derived from Eq. (13).

$$L_i = R - r - X \sin\frac{2\pi(i-1)}{N} - Y \cos\frac{2\pi(i-1)}{N} \qquad \text{Eq. (13)}$$

$$X \sin\frac{2\pi(i-1)}{N} + Y \cos\frac{2\pi(i-1)}{N} = R - r - L_i \qquad \text{Eq. (14)}$$

In the case of calculating the coordinates (X, Y) of the measuring device 100 based on the distance $L_i$ of the $i^{th}$ sensor chip 104 and a distance $L_j$ of a $j^{th}$ sensor chip 104, the following Eq. (15) is satisfied. Further, i and j are natural numbers that satisfy $1 \leq i \leq j \leq N$.

$$\begin{cases} X \sin\frac{2\pi(i-1)}{N} + Y \cos\frac{2\pi(i-1)}{N} = R - r - L_i \\ X \sin\frac{2\pi(j-1)}{N} + Y \cos\frac{2\pi(j-1)}{N} = R - r - L_j \end{cases} \qquad \text{Eq. (15)}$$

In other words, Eq. (16) is satisfied.

$$\begin{pmatrix} \sin\frac{2\pi(i-1)}{N} & \cos\frac{2\pi(i-1)}{N} \\ \sin\frac{2\pi(j-1)}{N} & \cos\frac{2\pi(j-1)}{N} \end{pmatrix} \begin{pmatrix} X \\ Y \end{pmatrix} = \begin{pmatrix} R - r - L_i \\ R - r - L_j \end{pmatrix} \qquad \text{Eq. (16)}$$

Here, if A is expressed by the following Eq. (17), a determinant becomes the following Eq. (18). $\theta$ indicates the angle between the $i^{th}$ sensor chip 104 and the $j^{th}$ sensor chip 104.

$$A = \begin{pmatrix} \sin\frac{2\pi(i-1)}{N} & \cos\frac{2\pi(i-1)}{N} \\ \sin\frac{2\pi(j-1)}{N} & \cos\frac{2\pi(j-1)}{N} \end{pmatrix} \qquad \text{Eq. (17)}$$

$$\det(A) = -\sin\frac{2\pi(j-i)}{N} = -\sin\theta \qquad \text{Eq. (18)}$$

As clear can be seen from Eq. (18), the determinant becomes 0 when j−i=N/2. In other words, when the number of sensor chips 104 is even, the determinant becomes 0 when the angle between two sensor chips 104 is 180°. Therefore, when the two sensor chips 104 satisfy such relationship, it is not possible to calculate the coordinates of the center position. Hence, it is required to perform an operation using the combination of other sensor chips 104. When the N-number of sensor chips 104 are arranged at equal intervals in the circumferential direction, the number of combinations of the sensor chips 104 whose coordinates can be calculated is $_NC_2$ when N is an odd number, and is $_NC_2 - N/2$ when N is an even number.

When the angle between the two sensor chips 104 is an angle other than 180°, the inverse matrix of A exists and, thus, the coordinates (X, Y) can be calculated as in the following Eq. (19).

$$\begin{pmatrix} X \\ Y \end{pmatrix} = \begin{pmatrix} \sin\frac{2\pi(i-1)}{N} & \cos\frac{2\pi(i-1)}{N} \\ \sin\frac{2\pi(j-1)}{N} & \cos\frac{2\pi(j-1)}{N} \end{pmatrix}^{-1} \begin{pmatrix} R - r - L_i \\ R - r - L_j \end{pmatrix} = \qquad \text{Eq. (19)}$$

$$\frac{1}{\det(A)} \begin{pmatrix} \cos\frac{2\pi(j-1)}{N} & -\cos\frac{2\pi(i-1)}{N} \\ -\sin\frac{2\pi(j-1)}{N} & \sin\frac{2\pi(i-1)}{N} \end{pmatrix} \begin{pmatrix} R - r - L_i \\ R - r - L_j \end{pmatrix} =$$

$$-\frac{1}{\sin\theta} \begin{pmatrix} (R-r-L_i)\cos\frac{2\pi(j-1)}{N} - (R-r-L_j)\cos\frac{2\pi(i-1)}{N} \\ -(R-r-L_i)\sin\frac{2\pi(j-1)}{N} + (R-r-L_j)\sin\frac{2\pi(i-1)}{N} \end{pmatrix}$$

Further, when X and Y are independent, the dispersion generally has the relationship of the following Eq. (20) and, thus, the following Eq. (21) is derived from Eq. (19).

$$V(aX + bY + c) = a^2 V(X) + b^2 V(Y) \qquad \text{Eq. (20)}$$

$$\begin{pmatrix} V(X) \\ V(Y) \end{pmatrix} = \frac{1}{\sin^2\theta} \begin{pmatrix} V(R-r-L_i) \cos^2\frac{2\pi(j-1)}{N} + \\ V(R-r-L_j) \cos^2\frac{2\pi(i-1)}{N} \\ V(R-r-L_i) \sin^2\frac{2\pi(j-1)}{N} + \\ V(R-r-L_j) \sin^2\frac{2\pi(i-1)}{N} \end{pmatrix} = \qquad \text{Eq. (21)}$$

$$\frac{1}{\sin^2\theta} \begin{pmatrix} V(L_i)\cos^2\frac{2\pi(j-1)}{N} + V(L_j)\cos^2\frac{2\pi(i-1)}{N} \\ V(L_i)\sin^2\frac{2\pi(j-1)}{N} + V(L_j)\sin^2\frac{2\pi(i-1)}{N} \end{pmatrix}$$

As can be seen from Eq. (21), a dispersion coefficient becomes large depending on the angle $\theta$ between the two sensor chips 104 used for the operation. Therefore, the range of the angle $\theta$ may be set depending on the measurement performance and the required accuracy. When the angle $\theta$ is 90° and 270°, the dispersion is minimized and the measurement accuracy becomes highest. On the other hand, as the angle $\theta$ becomes close to 0° and 180°, the dispersion increases and the measurement accuracy decreases. In one example, when the identifying part 174b identifies three or more sensor chips 104, the calculating part 174c may determine the combination of two sensor chips whose coordinates will be calculated based on the angle $\theta$. For example, in order to set the dispersion coefficient to 4 or less, the calculating part 174c may adopt the measurement values as an operation target when the angle $\theta$ between the two sensor chips 104 is 30° or more and 150° or less and when it is 210° or more and 330° or less.

Further, the calculating part 174c may further calculate the coordinates of the measuring device based on the combination of two sensor chips 104 including the sensor chip 104 that is not identified by the identifying part 174b.

Further, in the case of calculating the coordinates of the measuring device based on multiple combinations of the two sensor chips 104, the calculating part 174c may calculate the average of the multiple coordinates calculated based on the multiple combinations. In this case, the average of the coordinates may be calculated by a weighted average. For example, the average of the coordinates may be a weighted average using the angle between the two sensor chips 104 as a weight. In this case, the weight may be increased as the angle becomes close to 90° and 270°. If the weight for the case where the angle is other than 90° or 270° is set to zero, the coordinates are calculated only by the combination of the two sensor chips 104 forming an angle of 90° or 270°. Further, the weight may be increased as the measurement values are increased. In this case, the combinations of the two sensor chips 104 may be ranked based on the average or the sum of the measurement values of the two sensor chips 104, and the weight may be increased as the rank becomes higher. If the weight for the case where the rank is third and lower is set to zero, the coordinates are calculated by the combination of top two ranks. If the weight for the case where the rank is other than first is set to zero, the same calculation result as that obtained when the identifying part 174*b* identifies the top two sensor chips 104 having large measurement values is obtained. When the average of the deviation amounts calculated from multiple combinations of the sensor chips is obtained, the variation in the calculation results can be suppressed, and the deviation amount can be obtained with higher accuracy.

From the above description, it will be appreciated that various embodiments of the present disclosure have been described herein for purposes of illustration, and that various changes may be made without departing from the scope and spirit of the present disclosure. Therefore, the various embodiments disclosed herein are not intended to be limiting, with a true scope and spirit being indicated by the following claims.

The invention claimed is:

1. A method for measuring a deviation amount of a measuring device transferred by a transfer device, the measuring device including:

a disc-shaped base substrate; and four or more sensor electrodes arranged at equal intervals along a peripheral edge of the base substrate in a circumferential direction and configured to measure measurement values indicating capacitances between the four or more sensor electrodes and an object disposed at a lateral side, wherein the transfer device transfers an object to be processed into an area surrounded by an edge ring based on transfer position data, and the deviation amount is an amount of deviation of a center position of the measuring device with respect to a center position of the area, the measuring method comprising:

transferring, by using the transfer device, the measuring device to a position in the area specified by the transfer position data;

acquiring the measurement values using the four or more sensor electrodes of the measuring device transferred into the area;

identifying two or more sensor electrodes among the four or more sensor electrodes, wherein the two or more sensor electrodes output, as the measurement values, capacitances that satisfy a reliability standard; and calculating the deviation amount based on the measurement values of the identified two or more sensor electrodes, wherein in said identifying, top two sensor electrodes having large measurement values among the four or more sensor electrodes are identified as the two or more sensor electrodes, or wherein the four or more sensor electrodes are an even number of sensor electrodes, and in said identifying, a sensor electrode having a larger measurement value between a pair of sensor electrodes facing each other across a center of the measuring device is identified as the two or more sensor electrodes, or wherein in said identifying, a sensor electrode that outputs the measurement value greater than or equal to a predetermined threshold is identified as the two or more sensor electrodes, and the predetermined threshold is determined based on measurement values measured by the four or more sensor electrodes in a state where the center position of the area and the center position of the measuring device coincide with each other and the method further comprises determining whether or not there are two or more sensor electrodes that output the measurement values greater than or equal to the predetermined threshold.

2. The measuring method of claim 1, wherein in said calculating, when the identified two or more sensor electrodes are three or more sensor electrodes, an average of multiple deviation amounts calculated based on multiple combinations of two sensor electrodes selected from the three or more sensor electrodes is calculated.

3. The measuring method of claim 2, wherein the average of the deviation amounts is a weighted average.

4. A measuring system comprising:

a measuring device including a disc-shaped base substrate, and four or more sensor electrodes arranged at equal intervals along a peripheral edge of the base substrate in a circumferential direction and configured to measure measurement values indicating capacitances between the four or more sensor electrodes and an object disposed at a lateral side;

a transfer device configured to transfer the measuring device into the area that is surrounded by the edge ring and specified by transfer position data; and an operation part configured to calculate a deviation amount of the measuring device transferred by the transfer device, wherein the deviation amount is an amount of deviation of a center position of the measuring device with respect to a center position of the area, and the operation part:

acquires the measurement values obtained by the four or more sensor electrodes of the measuring device transferred into the area, identifies two or more sensor electrodes that output, as the measurement values, capacitances that satisfy a reliability standard among the four or more sensor electrodes, and calculates the deviation amount based on the measurement values of the identified two or more sensor electrodes, wherein the operation part identifies top two sensor electrodes having large measurement values among the four or more sensor electrodes as the two or more sensor electrodes.

5. A measuring device comprising:

a disc-shaped base substrate;

four or more sensor electrodes arranged at equal intervals along a peripheral edge of the base substrate in a circumferential direction and configured to measure measurement values indicating capacitances between the four or more sensor electrodes and an edge ring in a state where the base substrate is placed in an area surrounded by the edge ring; and a circuit board mounted on the base substrate and configured to:

acquire the measurement values obtained by the four or more sensor electrodes, identify two or more sensor electrodes that output, as the measurement values, capacitances that satisfy a reliability standard among the four or more sensor electrodes, and calculate a deviation amount of a center position of the base substrate with respect to a center position of the area based on the measurement values of the identified two or more sensor electrodes wherein the circuit board identifies top two sensor electrodes having large measurement values among the four or more sensor electrodes as the two or more sensor electrodes.

6. The measuring system of claim 4, wherein the operation part calculates, when the identified two or more sensor electrodes are three or more sensor electrodes, an average of multiple deviation amounts calculated based on multiple combinations of two sensor electrodes selected from the three or more sensor electrodes.

7. The measuring system of claim 6, wherein the average of the deviation amounts is a weighted average.

8. The measuring device of claim 5, wherein the circuit board calculates, when the identified two or more sensor electrodes are three or more sensor electrodes, an average of multiple deviation amounts calculated based on multiple combinations of two sensor electrodes selected from the three or more sensor electrodes.

9. The measuring device of claim 8, wherein the average of the deviation amounts is a weighted average.

* * * * *